(12) United States Patent
Yabe et al.

(10) Patent No.: US 9,178,392 B2
(45) Date of Patent: Nov. 3, 2015

(54) ROTOR OF PERMANENT MAGNET EMBEDDED MOTOR, COMPRESSOR, AND REFRIGERATION AND AIR CONDITIONING APPARATUS

(75) Inventors: Koji Yabe, Tokyo (JP); Yoshikazu Fujisue, Tokyo (JP); Hayato Yoshino, Tokyo (JP); Kazuhiko Baba, Tokyo (JP); Tomoaki Oikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 136 days.

(21) Appl. No.: 13/816,766

(22) PCT Filed: Aug. 27, 2010

(86) PCT No.: PCT/JP2010/064555
§ 371 (c)(1),
(2), (4) Date: Feb. 13, 2013

(87) PCT Pub. No.: WO2012/026032
PCT Pub. Date: Mar. 1, 2012

(65) Prior Publication Data
US 2013/0140922 A1    Jun. 6, 2013

(51) Int. Cl.
*H02K 1/27* (2006.01)
(52) U.S. Cl.
CPC .............. *H02K 1/2706* (2013.01); *H02K 1/276* (2013.01)
(58) Field of Classification Search
CPC .............................. H02K 1/276; H02K 1/2766
USPC ............. 310/156.48, 156.53, 156.56, 156.57
See application file for complete search history.

(56) References Cited

U.S. PATENT DOCUMENTS 5,369,325 A  *  11/1994  Nagate et al. ............ 310/156.54
7,233,090 B2 *  6/2007  Evans et al. .............. 310/156.57
(Continued)

FOREIGN PATENT DOCUMENTS

CN        1853330 A    10/2006
JP     2008-167583 A    7/2008
(Continued)

OTHER PUBLICATIONS

International Search Report of the International Searching Authority mailed Nov. 9, 2010 for the corresponding International application No. PCT/J132010/064555 (with English translation).
(Continued)

*Primary Examiner* — Dang Le
(74) *Attorney, Agent, or Firm* — Posz Law Group, PLC

(57) ABSTRACT

A rotor of a permanent magnet embedded motor according to this invention includes: a rotor iron core formed by stacking a predetermined number of electromagnetic steel plates perforated in a predetermined shape; a plurality of permanent magnet insertion holes formed along an outer circumferential section of the rotor iron core; permanent magnet end gaps provided at both ends of the permanent magnet insertion hole; a permanent magnet inserted in the permanent magnet insertion hole; and a plurality of slits formed in an iron core section on the outer side of the permanent magnet insertion hole. The width in the radial direction of a slit thin section of each of the slits between the slit and the rotor iron core outer circumference gradually increases from an inter-electrode side toward a magnetic pole center and changes in a sine wave shape having a peak in the magnetic pole center.

10 Claims, 23 Drawing Sheets

(56) References Cited

U.S. PATENT DOCUMENTS 7,282,827 B2    10/2007   Futami
2006/0273678 A1*  12/2006  Futami .................... 310/156.53

FOREIGN PATENT DOCUMENTS

| JP | 2008-187778 A | 8/2008 |
| JP | 4248984 B2 | 4/2009 |

OTHER PUBLICATIONS

Office Action dated Sep. 30, 2014 issued in corresponding CN patent application No. 201080068789.4 (and English translation).

* cited by examiner

CORNERS OF SLIT x ARE EDGES

CORNERS OF SLIT y ARE ROUNDED

ROTOR OF PERMANENT MAGNET EMBEDDED MOTOR, COMPRESSOR, AND REFRIGERATION AND AIR CONDITIONING APPARATUS

CROSS REFERENCE TO RELATED APPLICATION

This application is a U.S. national stage application of PCT/JP2010/064555 filed on Aug. 27, 2010, the disclosure of which is incorporated herein by reference.

TECHNICAL FIELD

The present invention relates to a rotor of a permanent magnet embedded motor and, more particularly, to a slit shape of slits arranged in an outer circumferential iron core section of a permanent magnet insertion hole. The present invention also relates to a compressor in which the rotor is used in a permanent magnet embedded motor and a refrigeration and air conditioning apparatus mounted with the compressor.

BACKGROUND

A rotor of a permanent magnet embedded motor having a configuration explained below has been proposed in the past. The rotor of the permanent magnet embedded motor includes a rotor iron core formed by stacking a plurality of electromagnetic steel plates, permanent magnet insertion holes formed in an axial direction of the rotor iron core and formed in regions corresponding to sides of a substantially regular polygon centering on the axis, permanent magnets inserted into the permanent magnet insertion holes, a plurality of slits formed in outer circumferential iron core sections of the permanent magnet insertion holes and arranged away from one another along the permanent magnet insertion holes, and outer side thin sections provided between radial direction outer side ends of the slits and the outer circumference of the rotor iron core, the width in the radial direction of the outer side thin sections gradually increasing from a magnetic pole center to an inter-electrode section. With such a configuration, it is possible to reduce a harmonic component of a magnetic flux density waveform of the inter-electrode section and reduce harmonics of an induced voltage and cogging torque (see, for example, Patent Literature 1).

CITATION LIST

Patent Literature

Patent Literature 1: Japanese Patent Application Laid-open No. 2008-167583.

SUMMARY

A slit shape of the rotor of the permanent magnet embedded motor in the past described in Patent Literature 1 has a width of the thin sections between the slits and the rotor outer circumferential section is gradually increased toward the inter-electrode section, so as to reduce the harmonics of the induced voltage.

However, it is desired to further reduce the harmonics of the induced voltage and reduce a torque ripple and noise.

The present invention has been devised to solve the problems explained above, and provides a rotor of a permanent magnet embedded motor that can reduce magnetism saturation due to slits arranged in outer circumferential iron core sections of permanent magnet insertion holes and reduce a torque ripple.

The present invention also provides a compressor in which the rotor is used for a permanent magnet embedded motor.

Further, the present invention relates to a refrigeration and air conditioning apparatus mounted with the compressor.

A rotor of a permanent magnet embedded motor according to this invention, comprises:
a rotor iron core formed by stacking a predetermined number of electromagnetic steel plates perforated in a predetermined shape;
a plurality of permanent magnet insertion holes formed along an outer circumferential section of the rotor iron core;
permanent magnet end gaps provided at both ends of the permanent magnet insertion hole;
a permanent magnet inserted into the permanent magnet insertion hole; and
a plurality of slits formed in an iron core section on an outer side of the permanent magnet insertion hole, wherein
a width in a radial direction of a slit thin section of each of the slits between the slit and the rotor iron core outer circumference gradually increases from an inter-electrode side toward a magnetic pole center and changes in a sine wave shape having a peak in the magnetic pole center.

The rotor of the permanent magnet embedded motor according to the present invention is configured such that a width of the slit thin section of each of the slits in the radial direction between the slit and the rotor iron core outer circumference gradually increases from the inter-electrode side toward the magnetic pole center and changes along a sine wave having a peak in the magnetic pole center, whereby a torque ripple can be reduced.

DETAILED DESCRIPTION

First Embodiment

Figure 1:
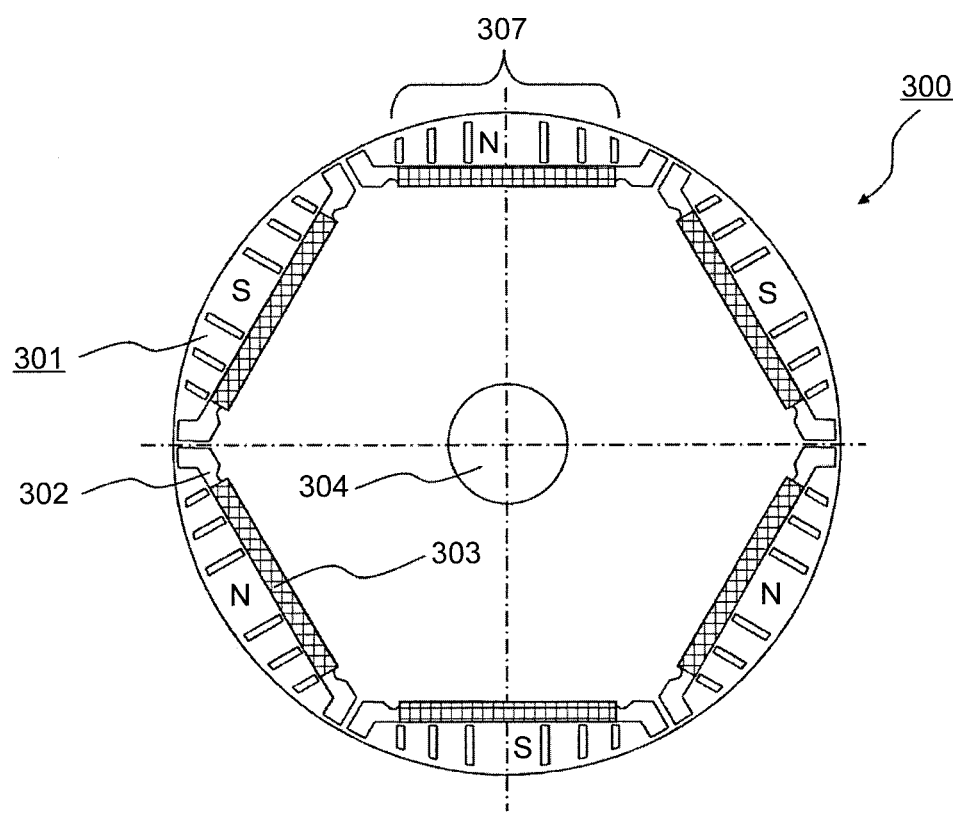
FIG. 1 is a transverse cross sectional view of a rotor 300 of a permanent magnet embedded motor provided with commonly-used slits 307, which is intended to make a comparison.
Figure 2:
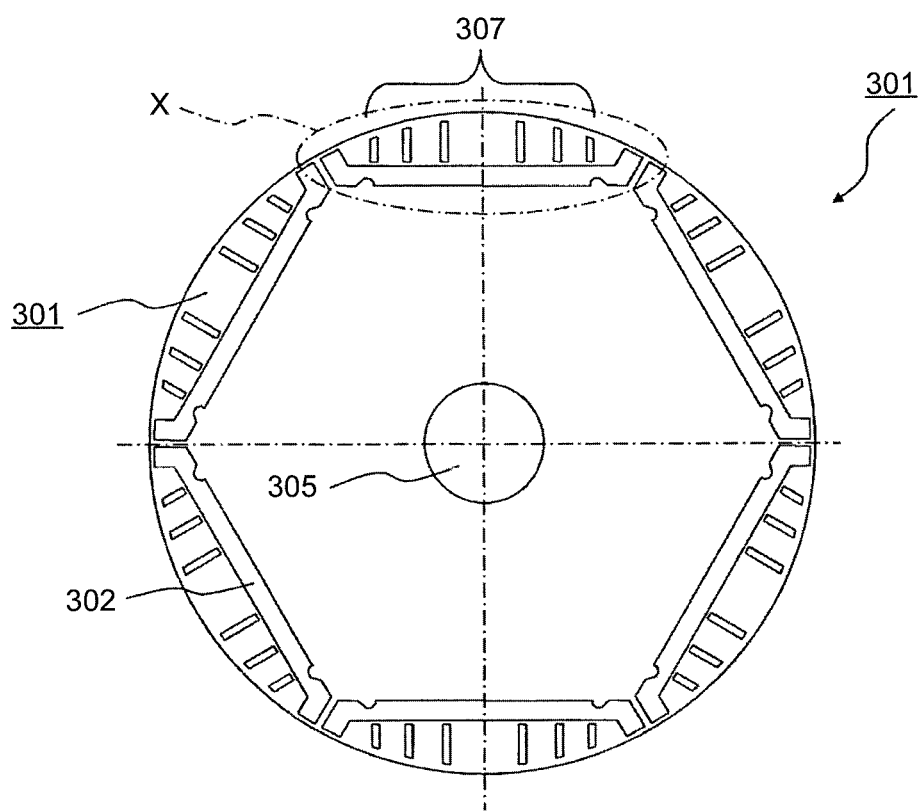
FIG. 2 is a transverse cross sectional view of a rotor iron core 301.
Figure 3:
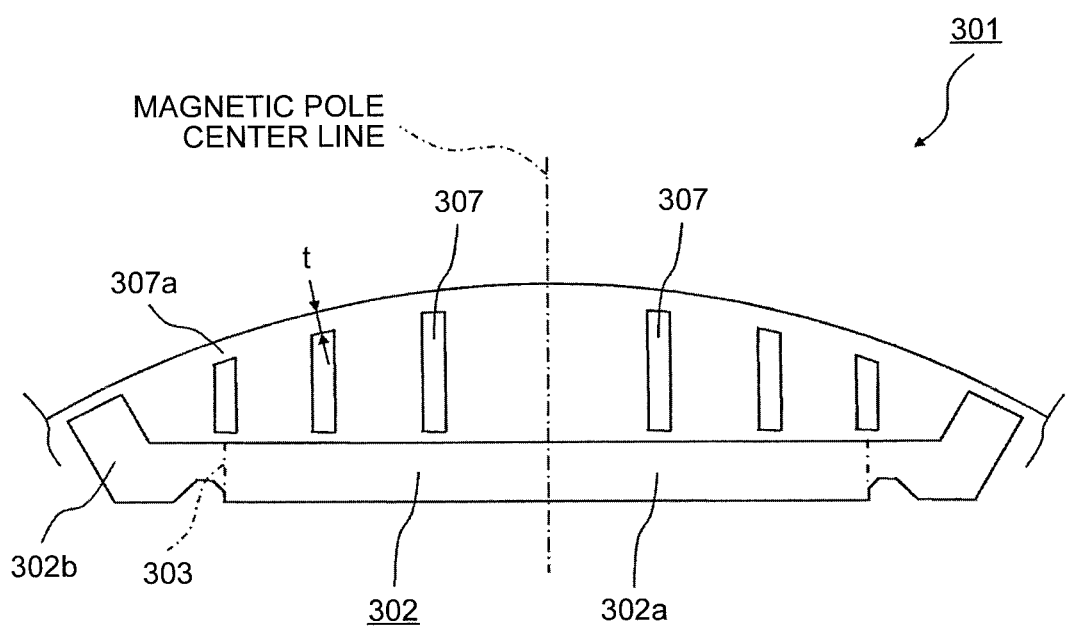
FIG. 3 is an enlarged view of an X-part of FIG. 2.

FIGS. 1 to 3 are diagrams shown for comparison. FIG. 1 is a transverse cross sectional view of a rotor 300 of a permanent magnet embedded motor provided with commonly-used slits 307. FIG. 2 is a transverse cross sectional view of a rotor iron core 301. FIG. 3 is an enlarged view of an X-part of FIG. 2.

First, the general permanent magnet embedded motor (a brushless DC motor) is explained. The rotor 300 of the permanent magnet embedded motor provided with the commonly-used slits 307 shown in FIG. 1 includes at least the rotor iron core 301, permanent magnets 303 and a rotating shaft 304.

The rotor 300 and the like of the permanent magnet embedded motor are sometimes simply referred to as rotor 300 or rotor.

The rotor iron core 301 has a substantially circular shape as an overall transverse cross sectional shape. The rotor iron core 301 is formed by perforating, with a die, a thin electromagnetic steel plate (e.g., a non-directional electromagnetic steel plate (whose crystal axis directions of crystals are arranged as randomly as possible so as not to show a magnetic characteristic biased in a particular direction of the steel plate) having a thickness of about 0.1 to 1.0 mm) in a predetermined shape, and stacking a predetermined number (a plurality) of the electromagnetic steel plates.

In the rotor iron core 301, a plurality of (six) permanent magnet insertion holes 302 having a rectangular transverse cross section are formed at substantially equal intervals in the circumferential direction (see FIG. 2). A shaft hole 305 is formed in a substantially center section of the rotor iron core 301, in which the rotating shaft 304 is fitted. The rotor 300 having six poles is formed by inserting six flat-shaped permanent magnets 303 magnetized to alternately have N poles and S poles into the inside of magnet insertion sections 302a (see FIG. 3) of the permanent magnet insertion holes 302.

For the permanent magnets 303, for example, rare earths containing neodymium, iron and boron as main components are used.

As shown in FIG. 3, the permanent magnet insertion hole 302 has permanent magnet end gaps 302b coupled to (communicating with) the magnet insertion section 302a, which are formed on both sides of the magnet insertion section 302a situated substantially in a center thereof. The permanent magnet end gaps 302b limits leakage magnetic fluxes of the permanent magnet 303 in an inter-electrode section (between magnetic poles formed by the permanent magnets 303 and between the permanent magnet insertion holes 302). As shown in FIG. 3, a plurality of slits 307 are formed in the circumferential direction at predetermined intervals in the outer circumferential iron core section of the permanent magnet insertion hole 302. As shown in FIG. 3, in the rotor iron core 301, six slits 307 are formed for one magnetic pole symmetrically with respect to the pole center; three slits 307 are formed on each side of the pole center.

As shown in FIG. 3, dimensions t in the radial direction of a slit thin section 307a (a thin iron core section) between the outer circumferential section of the rotor iron core 301 and the slits 307 are the same (uniform) in the six slits 307 of one magnetic pole.

It is possible to reduce a torque ripple (pulsation of torque) by regulating magnetic fluxes from the permanent magnet 303 with providing the slits 307.

This is an effect obtained by virtue of the fact that harmonic components of an induced voltage are reduced and cogging torque is reduced by the presence of the slits 307.

However, although a permanent magnet embedded motor using the rotor 300 shown in FIG. 1 can reduce a torque ripple through the effect of the slits 307, further reduction in the torque ripple is requested in order to realize further reduction in noise.

In the rotor 300 shown in FIG. 1, as a factor of deterioration in torque ripple, there is magnetic saturation of the slit thin section 307a.

The slits 307 cause magnetic fluxes generated from the permanent magnet 303 to be close to a sine wave and contribute to reduction in harmonic components of an induced voltage and reduction in cogging torque.

The dimension t in the radial direction of the slit thin section 307a is desirably as small as possible because the slits 307 regulate the magnetic fluxes from the permanent magnet 303. However, a processable minimum dimension in perforating the rotor iron core 301 with a press is generally about the thickness of an electromagnetic steel plate and set to about 0.1 to 1.0 mm.

On the other hand, the dimension t in the radial direction of the slit thin section 307a needs to be set to a dimension resistible to a centrifugal force.

Further, the dimension t in the radial direction of the slit thin section 307a needs to be set to a dimension equal to or larger than a predetermined dimension because the dimension t is limited by a die shape.

Further, the dimension t in the radial direction of the slit thin section 307a is often set as small and uniform as possible in order to regulate the magnetic fluxes from the permanent magnet 303. In FIG. 3, the dimensions t in the radial direction of the slit thin sections 307a are uniform in the respective slit thin sections 307a (six places).

However, if the thicknesses t in the radial direction of the slit thin sections 307a are set small and uniform in the respective slit thin sections 307a, then the slit thin section 307a is magnetically saturated and its magnetic permeability falls. Such effects cause a torque ripple to worsen and noise to increase.

In the rotor of the permanent magnet embedded motor in this embodiment, the dimension in the radial direction of the slit thin section between each of the plurality of slits in one magnetic pole and the rotor iron outer circumferential section is set in a sine wave shape with respect to an angle formed by the magnetic pole center and the slit, whereby a torque ripple is reduced.

Figure 4:
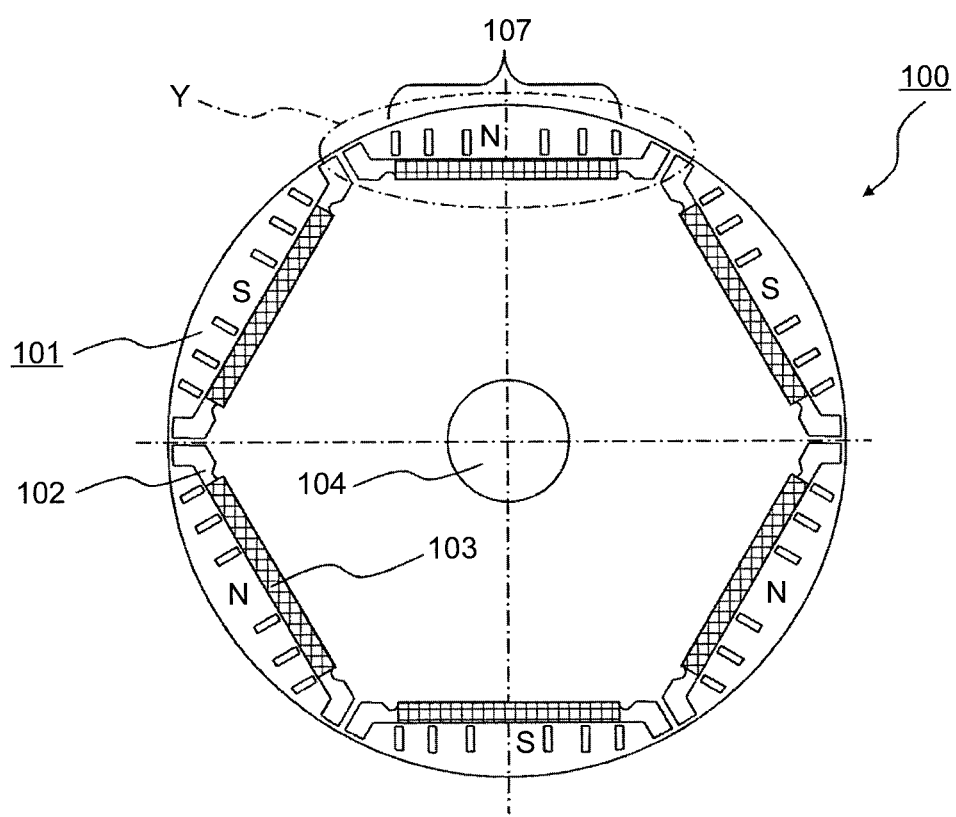
FIG. 4 is a transverse cross sectional view of a rotor 100 of a permanent magnet embedded motor, which shows a first embodiment.
Figure 5:
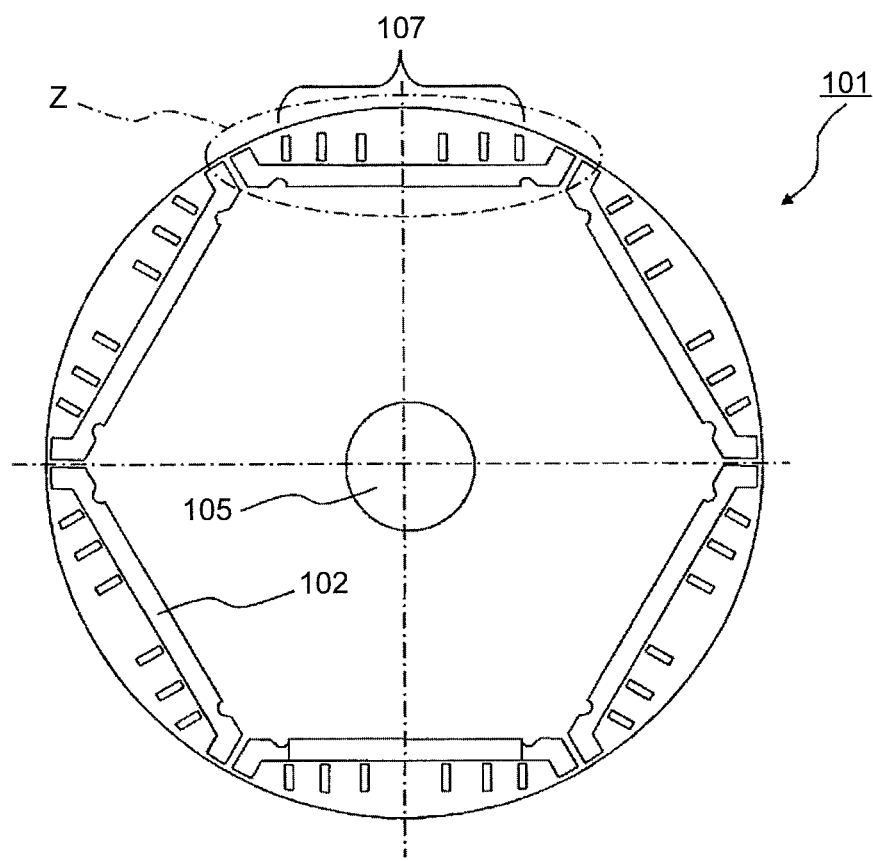
FIG. 5 is a transverse cross sectional view of a rotor iron core 101, which shows the first embodiment.
Figure 6:
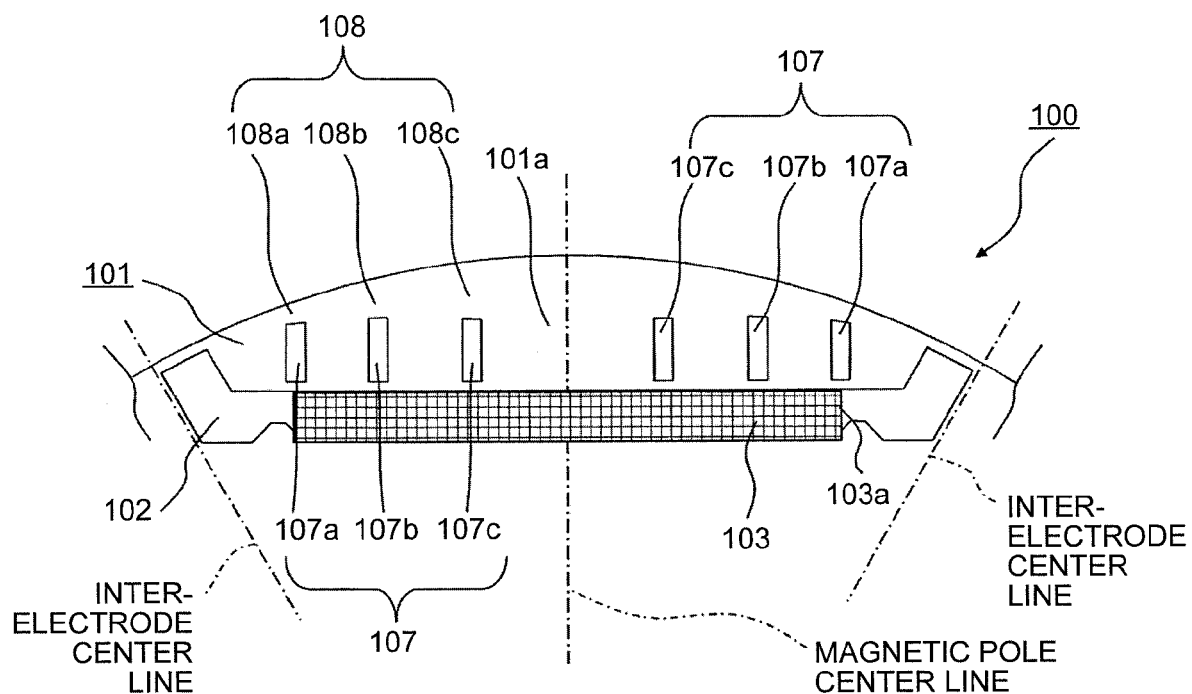
FIG. 6 is an enlarged view of a Y-part of FIG. 4.
Figure 7:
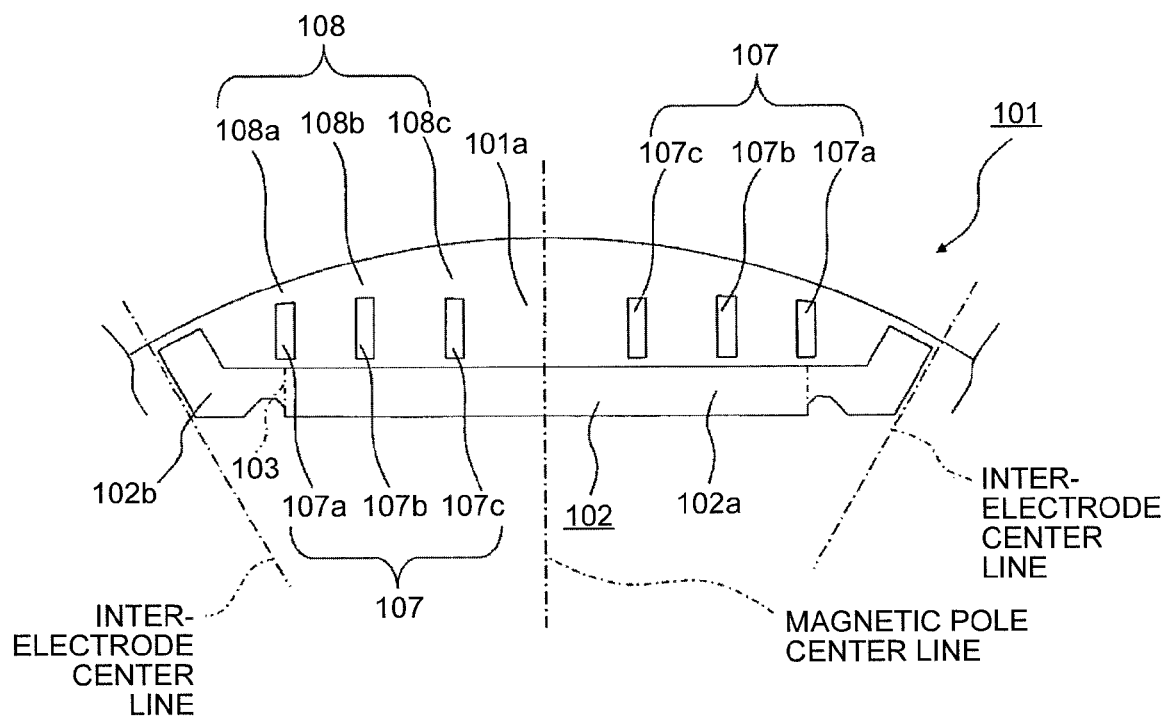
FIG. 7 is an enlarged view of a Z-part of FIG. 5.
Figure 8:
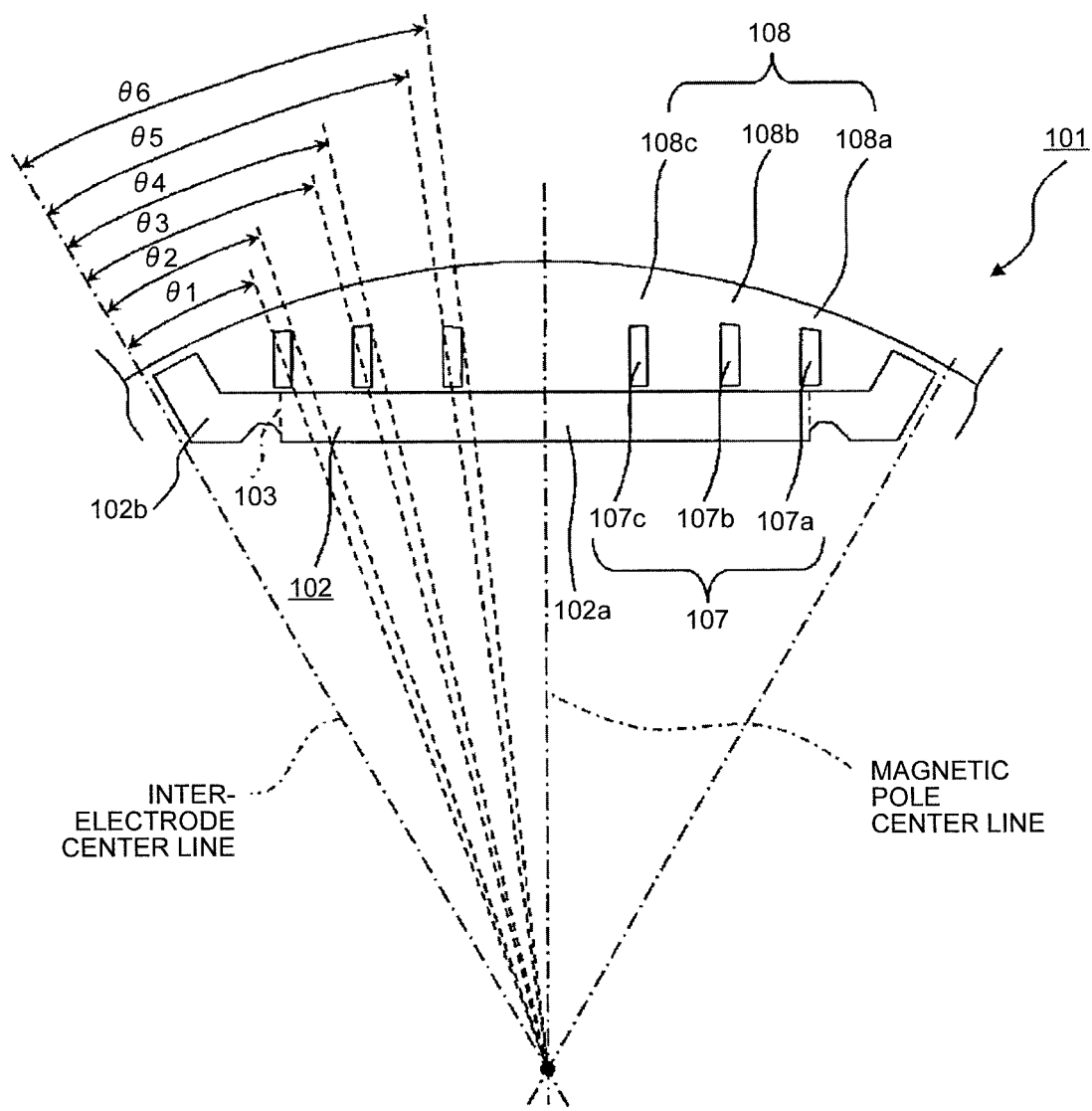
FIG. 8 is an illustration in which angles formed by an inter-electrode center line and ends of slits 107 on an outer circumference side of a rotor are defined, which shows the first embodiment.
Figure 9:
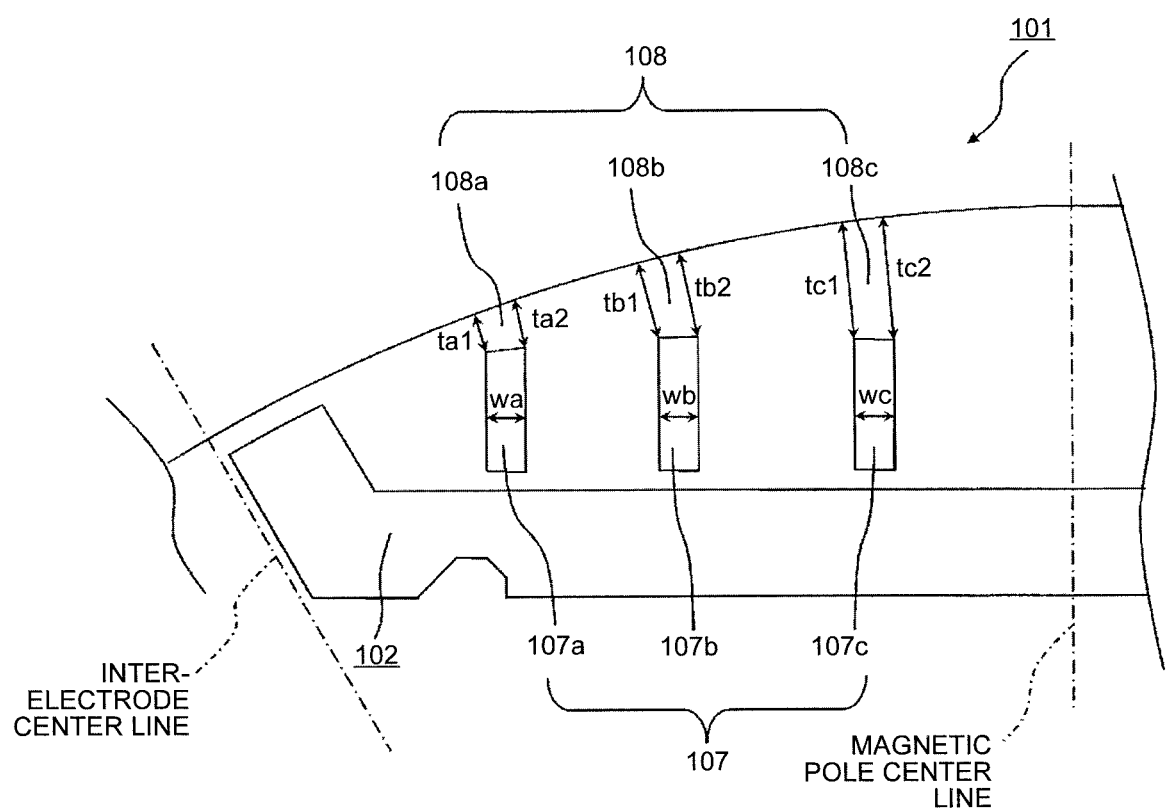
FIG. 9 is an illustration showing the first embodiment, in which the widths of slit thin sections 108 in the radial direction are defined.

FIGS. 4 to 9 are figures showing a first embodiment. FIG. 4 is a transverse cross sectional view of a rotor 100 of a permanent magnet embedded motor. FIG. 5 is a transverse cross sectional view of a rotor iron core 101. FIG. 6 is a Y-part enlarged view of FIG. 4. FIG. 7 is a Z-part enlarged view of FIG. 5. FIG. 8 is an illustration in which angles formed between an inter-electrode center line and ends of the slits 107 on a rotor outer circumference side are defined. FIG. 9 is an illustration in which the widths in the radial direction of slit thin sections 108 are defined.

The configuration of the rotor 100 of the permanent magnet embedded motor (a brushless DC motor) is explained with reference to FIGS. 4 to 9.

The rotor 100 of the permanent magnet embedded motor is simply referred to as rotor 100. The rotor 100 is sometimes referred to as rotor.

The rotor 100 shown in FIG. 4 includes at least the rotor iron core 101, permanent magnets 103, and a rotating shaft 104.

The rotor iron core 101 has a substantially circular shape as an overall transverse cross sectional shape. The rotor iron core 101 is formed by perforating, with a die, a thin electromagnetic steel plate (e.g., a non-directional electromagnetic steel plate (in which crystal axis directions of crystals are arranged as randomly as possible so as not to show a magnetic characteristic biased toward a specific direction of the steel plate) having a thickness of about 0.1 to 1.0 mm) in a predetermined shape and stacking a predetermined number (a plurality) of the electromagnetic steel plates.

In the rotor iron core 101, six permanent magnet insertion holes 102 having rectangular transverse cross sections are provided to form a substantially hexagonal shape in the circumferential direction (see FIG. 5).

The rotor 100 having six poles is formed by inserting six flat-shaped permanent magnets 103 magnetized to alternately have N poles and S poles into the inside of magnet insertion sections 102a (see FIG. 7) of the permanent magnet insertion holes 102. A shaft hole 105 in which the rotating shaft 104 fits is formed in substantially the center of the rotor iron core 101 (see FIG. 5).

For the permanent magnets 103, for example, rare earths containing neodymium, iron, and boron as main components are used.

As shown in FIG. 7, in the permanent magnet insertion hole 102, permanent magnet end gaps 102b coupled to (communicating with) the magnet insertion section 102a are formed on both sides of the magnet insertion section 102a substantially situated in the center. The permanent magnet end gaps 302b suppress leakage magnetic fluxes of the permanent magnet 103 in an inter-electrode section (between magnetic poles formed by the permanent magnets 103 and between the permanent magnet insertion holes 102).

As shown in FIGS. 6 and 7, a plurality of slits 107 (first slits 107a, second slits 107b, and third slits 107c are arranged bilaterally symmetrically with respect to the magnetic pole center line) are formed in an outer circumferential iron core section 101a of the permanent magnet insertion hole 102. The third slit 107c is closest to the magnetic pole center line. The second slit 107b and the first slit 107a are formed in order toward the inter-electrode section (the inter-electrode center line). The slits 107 and the like are sometimes simply referred to as slits.

The slits 107 are defined as follows.
(1) The first slits 107a are located on the end side of the permanent magnet 103 (the permanent magnet end gap 102b side, the inter-electrode section side) and present in the radial direction of an end face 103a at the end of the permanent magnet 103. However, the first slits 107a may be present in positions not overlapping the end face 103a.
(2) The second slits 107b are located adjacent to the first slits 107a and on the magnetic pole center side.
(3) The third slits 107c are located adjacent to the second slits 107b and on the magnetic pole center side.

In one magnetic pole, the first slits 107a, the second slits 107b, and the third slits 107c are disposed in bilaterally symmetric arrangement.

As shown in FIGS. 6 and 7, slit thin sections 108, that are iron core portions, are provided between the outer circumference of the rotor iron core 101 and the slits 107.
(1) A slit thin section 108a is provided between the outer circumference of the rotor iron core 101 and the first slit 107a.
(2) A slit thin section 108b is provided between the outer circumference of the rotor iron core 101 and the second slit 107b.
(3) A slit thin section 108c is provided between the outer circumference of the rotor iron core 101 and the third slit 107c.

As shown in FIG. 8, angles formed between the inter-electrode center line and the ends of the slits 107 on an outer circumference side of the rotor are defined as follows.
(1) θ1 is defined as an angle formed between a line connecting an end of the first slit 107a on the rotor outer circumference side and on the inter-electrode side with the center of the rotor iron core 101 and the inter-electrode center line;
(2) θ2 is defined as an angle formed between a line connecting an end of the first slit 107a on the rotor outer circumference side and on the magnetic pole center side with the center of the rotor iron core 101 and the inter-electrode center line.
(3) θ3 is defined as an angle formed between a line connecting an end of the second slit 107b on the rotor outer circumference side and on the inter-electrode side with the center of the rotor iron core 101 and the inter-electrode center line.
(4) θ4 is defined as an angle formed between a line connecting an end of the second slit 107b on the rotor outer circumference side and on the magnetic pole center side with the center of the rotor iron core 101 and the inter-electrode center line.
(5) θ5 is defined as an angle formed between a line connecting an end of the third slit 107c on the rotor outer circumference side and on the inter-electrode side with the center of the rotor iron core 101 and the inter-electrode center line.
(6) θ6 is defined as an angle formed between a line connecting an end of the third slit 107c on the rotor outer circumference side and on the magnetic pole center side with the center of the rotor iron core 101 and the inter-electrode center line.

As shown in FIG. 9, widths (dimensions) of the slit thin sections 108 in the radial direction are defined as follows.
(1) ta1 is defined as a width (a shortest distance) in the radial direction at the inter-electrode side end of the slit thin section 108a on the rotor outer circumference side.

(2) ta2 is defined as a width (a shortest distance) in the radial direction at the magnetic pole center side end of the slit thin section 108a on the rotor outer circumference side.
(3) tb1 is defined as a width (a shortest distance) in the radial direction at the inter-electrode side end of the slit thin section 108b on the rotor outer circumference side.
(4) tb2 is defined as a width (a shortest distance) in the radial direction at the magnetic pole center side end of the slit thin section 108b on the rotor outer circumference side.
(5) tc1 is defined as a width (shortest distance) in the radial direction at the inter-electrode side end of the slit thin section 108c on the rotor outer circumference side.
(6) tc2 is defined as a width (shortest distance) in the radial direction at the magnetic pole center side end of the slit thin section 108c on the rotor outer circumference side.

ta1 and ta2 have a relation of ta1<ta2. The width of the slit thin section 108a gradually increases from the inter-electrode side toward the magnetic pole center.

tb1 and tb2 have a relation tb1<tb2. The width of the slit thin section 108b gradually increases from the inter-electrode side toward the magnetic pole center.

Further, tc1 and tc2 have a relation tc1<tc2. The width of the slit thin section 108c gradually increases from the inter-electrode side toward the magnetic pole center.

Widths in the circumferential direction of the slits 107 (the first slit 107a, the second slit 107b, and the third slit 107c) are defined as follows.
(1) wa is defined as a width of the first slit 107a in the circumferential direction.
(2) wb is defined as a width of the second slit 107b in the circumferential direction.
(3) wc is defined as a width of the third slit 107c in the circumferential direction.

In this embodiment, basically, wa=wb=wc (about 1.0 to 1.5 mm). However, a form of wa>wb=wc may also be adopted. If wa>wb=wc, the width wa of the first slit 107a located at the end of the permanent magnet 103 is larger than wb and wc. Therefore, there is an effect of suppressing leakage of magnetic fluxes at the end of the permanent magnet 103.

A torque ripple can be reduced by setting relations between ta1, ta2, tb1, tb2, tc1 and tc2, and θ1 to θ6 as shown below.

$$ta1 = K\sin(\theta 1 \times P/2) \quad \text{Formula (1)}$$

$$ta2 = K\sin(\theta 2 \times P/2) \quad \text{Formula (2)}$$

$$tb1 = K\sin(\theta 3 \times P/2) \quad \text{Formula (3)}$$

$$tb2 = K\sin(\theta 4 \times P/2) \quad \text{Formula (4)}$$

$$tc1 = K\sin(\theta 5 \times P/2) \quad \text{Formula (5)}$$

$$tc2 = K\sin(\theta 6 \times P/2) \quad \text{Formula (6)}$$

where, K represents a constant and P represents the number of poles (herein, P=6 (FIG. 4)).

Figure 10:
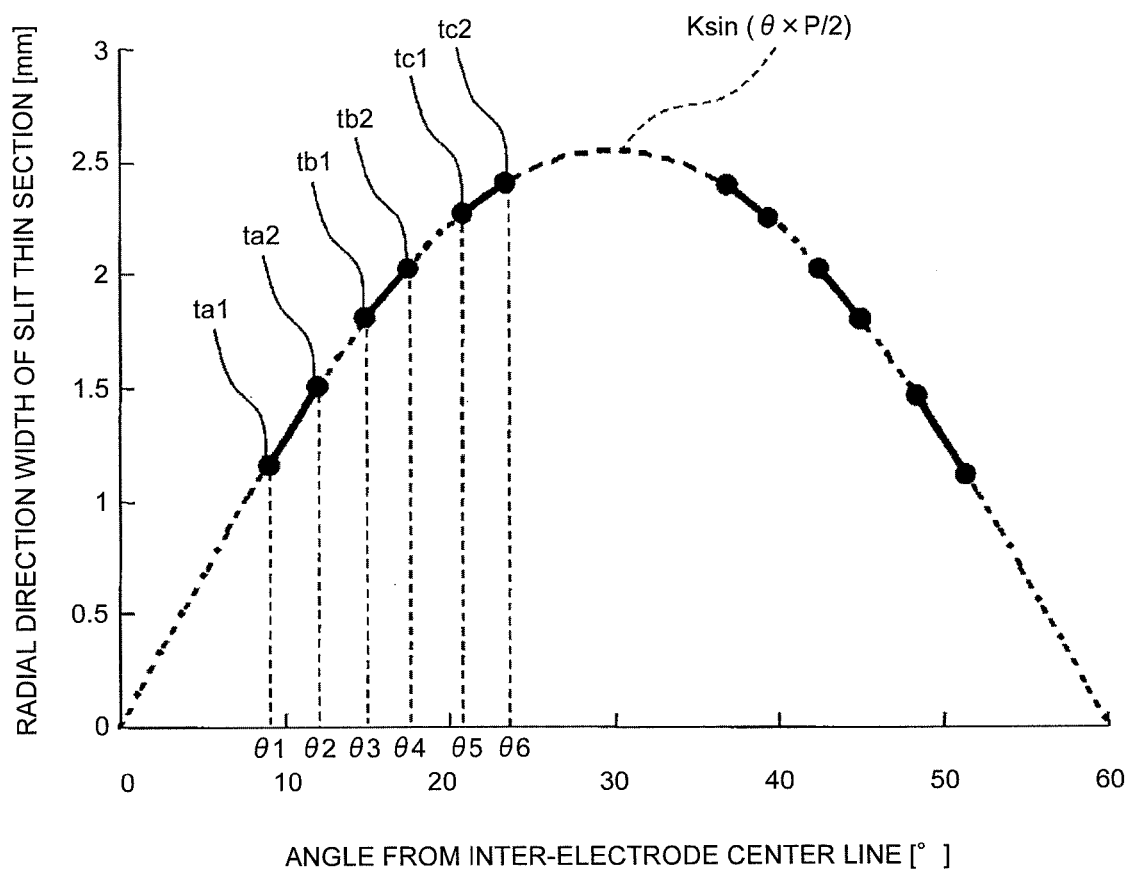
FIG. 10 is a graph showing the first embodiment, in which a relation between the radial direction width of the slit thin section and angles from the inter-electrode center line is described.

A principle in question is explained below. FIG. 10 is a graph showing the first embodiment, in which a relation between the width in the radial direction of the slit thin section and the angle from the inter-electrode center line is described. In FIG. 10, ta, tb and tc obtained by Formulas (1) to (6) are plotted. The widths in the radial direction of the slit thin sections between the inter-electrode side ends on the rotor outer circumference side of the slit thin sections 108a to 108c and the magnetic pole center side ends on the rotor outer circumference side of the slit thin sections 108a to 108c are indicated by lines connecting points of the ends.

If the widths in the radial direction of the slit thin sections 108a to 108c are set to satisfy Formulas (1) to (6), then the widths in the radial direction of the slit thin sections 108a to 108c can be gradually increased along a sine wave from one inter-electrode side toward the magnetic pole center and gradually reduced along the sine wave from the magnetic pole center toward the other inter-electrode side.

For example, when K=2.55, θ1=9[°], θ2=12[°], θ3=15[°], θ4=18[°], θ5=21[°], and θ6=24 deg, the dimensions in the radial direction of the slit thin sections 108a to 108c are calculated based on Formulas as shown below.

$$ta1 = 1.158 \text{ mm}$$

$$ta2 = 1.500 \text{ mm}$$

$$tb1 = 1.803 \text{ mm}$$

$$tb2 = 2.063 \text{ mm}$$

$$tc1 = 2.272 \text{ mm}$$

$$tc2 = 2.425 \text{ mm}$$

In the example explained above, the width (the shortest distance) ta1 (=1.158 mm) in the radial direction at the inter-electrode side end on the rotor outer circumference side of the slit thin section 108a is the smallest. As explained above, this width is set larger than the thickness (e.g., about 0.1 to 1.0 mm) of the electromagnetic steel plate to enable processing in perforating the rotor iron core 101 with a press.

As shown in FIG. 10, the radial direction widths ta1, ta2, tb1, tb2, tc1, and tc2 of the slit thin sections 108a, 108b and 108c, and the radial direction widths among them are present on a curve of a sine wave.

In the example explained above, the radial direction widths of the slit thin sections 108a, 108b and 108c respectively change in the sine wave shape like ta1 to ta2, tb1 to tb2 and tc1 to tc2, and are not uniform. However, the respective radial direction widths may be set uniform. However, in that case, it is essential that the respective uniform radial direction widths are between ta1 and ta2, between tb1 and tb2, and between tc1 and tc2.

The slit thin sections are formed thin and uniform, whereby the slit thin sections are magnetically saturated and its magnetic permeability falls. Then, a torque ripple worsens and noise increases. Therefore, it is possible to reduce the torque ripple by increasing the thickness of the slit thin sections and reducing the influence of the magnetic saturation of the slit thin sections. However, even if the slit thin sections are increased in size, the effect of regulating the magnetic fluxes from the permanent magnet decreases and the effect can not be effectively shown.

The widths in the radial direction of the slit thin sections 108a, 108b and 108c are set to ta1 to ta2, tb1 to tb2 and tc1 to tc2 determined by Formulas (1) to (6), whereby the widths in the radial direction of the slit thin sections are larger in places closer to the magnetic pole center and are widths in accordance with a sine wave with respect to the angles from the inter-electrode section.

To reduce the torque ripple, reduction of harmonics of an induced voltage is effective. To reduce harmonics, it is desired that magnetic fluxes generated from the rotor 100 have a sinusoidal form. If the slit thin sections are uniformly formed, because saturated magnetic flux densities of the slit thin sections are the same, magnetic flux contents in the radial direction of the slit thin sections are also substantially the same irrespective of the positions of the slits.

The widths in the radial direction of the slit thin sections 108a, 108b and 108c are set to ta1 to ta2, tb1 to tb2 and tc1 to tc2 determined by Formulas (1) to (6), whereby magnetic flux contents of the slit thin sections 108a, 108b and 108c also sinusoidally change. In other words, if the magnetic fluxes generated from the rotor 100 by the slits 107 are made in a sinusoidal from and the widths in the radial direction of the slit thin sections 108a, 108b and 108c are set to ta1 to ta2, tb1 to tb2 and tc1 to tc2 determined by Formulas (1) to (6), then the magnetic fluxes of the slit thin sections 108a, 108b and 108c are also sinusoidal. Therefore, the harmonics of the induced voltage are reduced, thereby leading to reduction in the torque ripple.

When Formulas (1) to (6) are generalized, Formulas (7) and (8) are obtained.

$$tx1 = K \sin(\theta x1 \times P/2) \quad \text{Formula (7)}$$

$$tx2 = K \sin(\theta x2 \times P/2) \quad \text{Formula (8)}$$

In the formulas, tx1 is a width in the radial direction at an inter-electrode side end on a rotor outer circumference side of a slit thin section of a slit x;

tx2 is a width in the radial direction at the magnetic pole center side end on the rotor outer circumference side of the slit thin section of the slit x;

θx1 is an angle formed between a line connecting an end of the slit x on the rotor outer circumference side and on the inter-electrode side with the center of the rotor iron core 101 and the inter-electrode center line;

θx2 is an angle formed between a line connecting an end of the slit x on the rotor outer circumference side and on the magnetic pole center side with the center of the rotor iron core 101 and the inter-electrode center line;

K is a constant; and

P is the number of poles.

A relation θx1<θx2 is satisfied.

The effect can be more effectively shown if Formulas (7) and (8) are applied to only the slits 107 present in the radial direction of the permanent magnet 103. This is because the influence of the magnetic fluxes from the permanent magnet 103 on slits 107 not present in the radial direction of the permanent magnet 103 is small, and even if Formulas (7) and (8) are not satisfied, the influence thereof is small.

When the widths in the radial direction of the slit thin sections that is not present in the radial direction of the permanent magnet 103 and that is close to the inter-electrode sections are smaller, there is a more effect on reduction in leakage magnetic fluxes. Therefore, the widths are set smaller than the widths in the radial direction of the other slit thin sections, whereby the leakage magnetic fluxes can be reduced and a magnetic flux content increases. As a result, it is possible to configure a highly-efficient rotor 100.

The six slits 107 of the rotor 100 shown in FIG. 4 are provided for one magnetic pole. However, the effect is attained even when six or more slits 107 are provided. The effect is attained even when four slits 107 are provided for one magnetic pole. However, when the four slits 107 are provided, because the number of slit thin sections are only four for one magnetic pole, harmonics increase. Therefore, the six or more slits 107 for one magnetic pole is desirable to form a sine wave. When the six or more slits 107 are present for one magnetic pole, the effect is attained if a relation among the widths in the radial direction of at least six slit thin sections satisfies Formulas (7) and (8).

The slits 107 (the first slits 107a, the second slits 107b and the third slits 107c) shown in FIG. 7 are arranged at substantially equal intervals. However, the effect is attained even if the slits 107 are not arranged at equal intervals.

Figure 11:
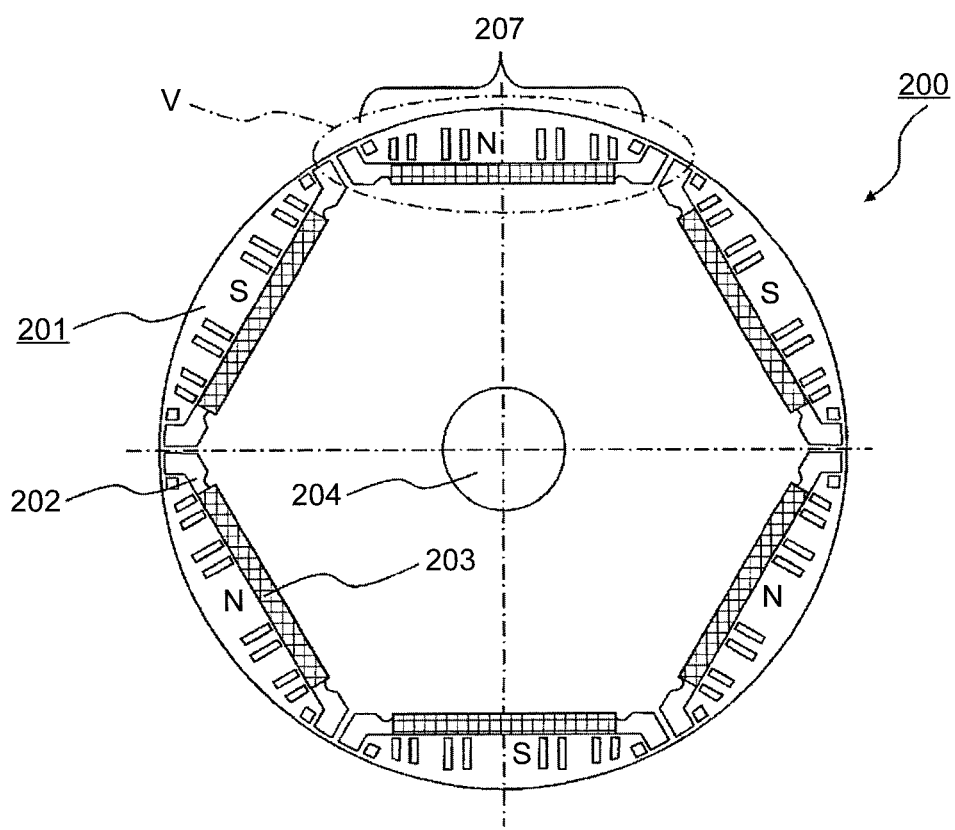
FIG. 11 is a transverse cross sectional view of a rotor 200 of a permanent magnet embedded motor in a modification of the first embodiment.
Figure 12:
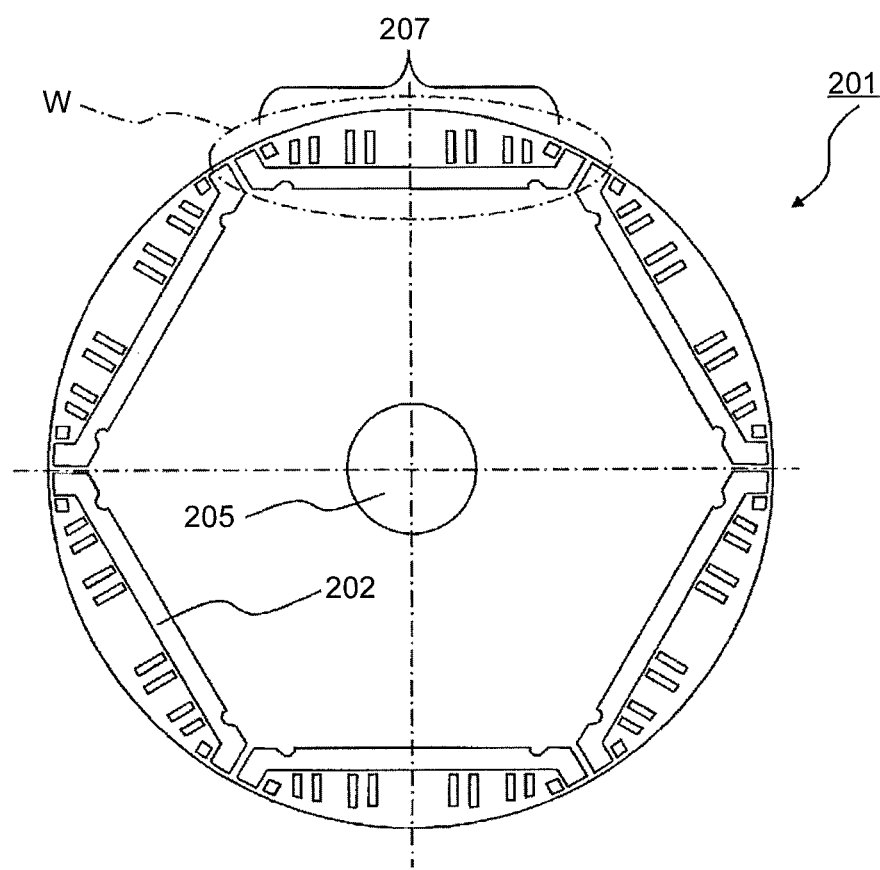
FIG. 12 is a transverse cross sectional view of a rotor iron core 201 in the modification of the first embodiment.
Figure 13:
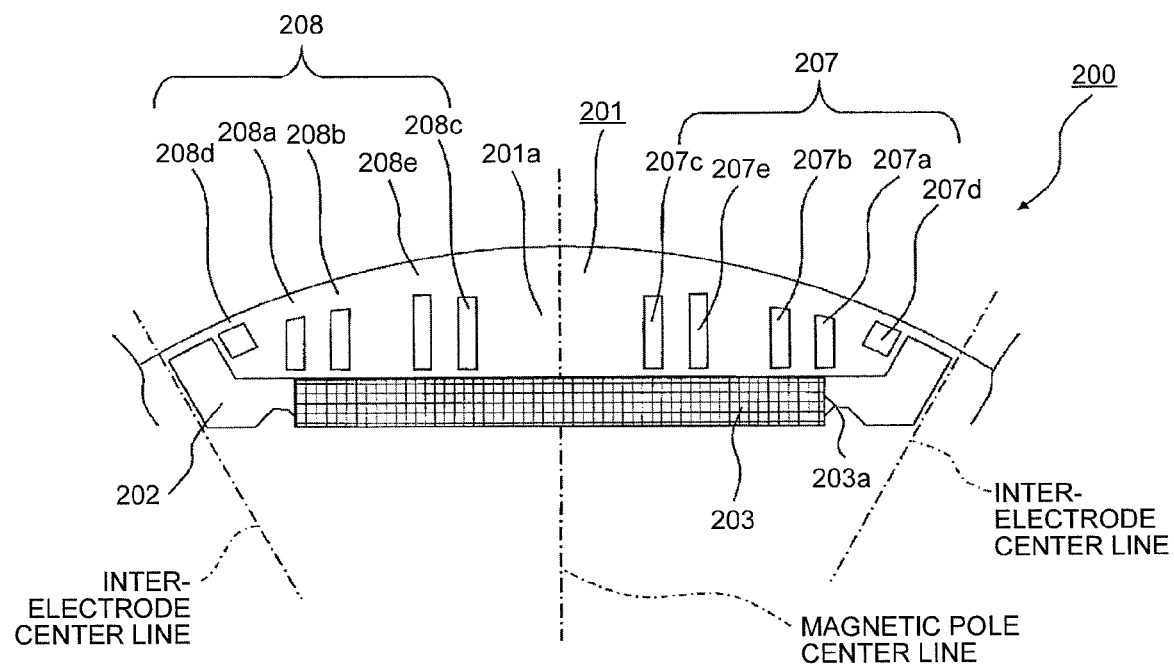
FIG. 13 is an enlarged view of a V-part of FIG. 11.
Figure 14:
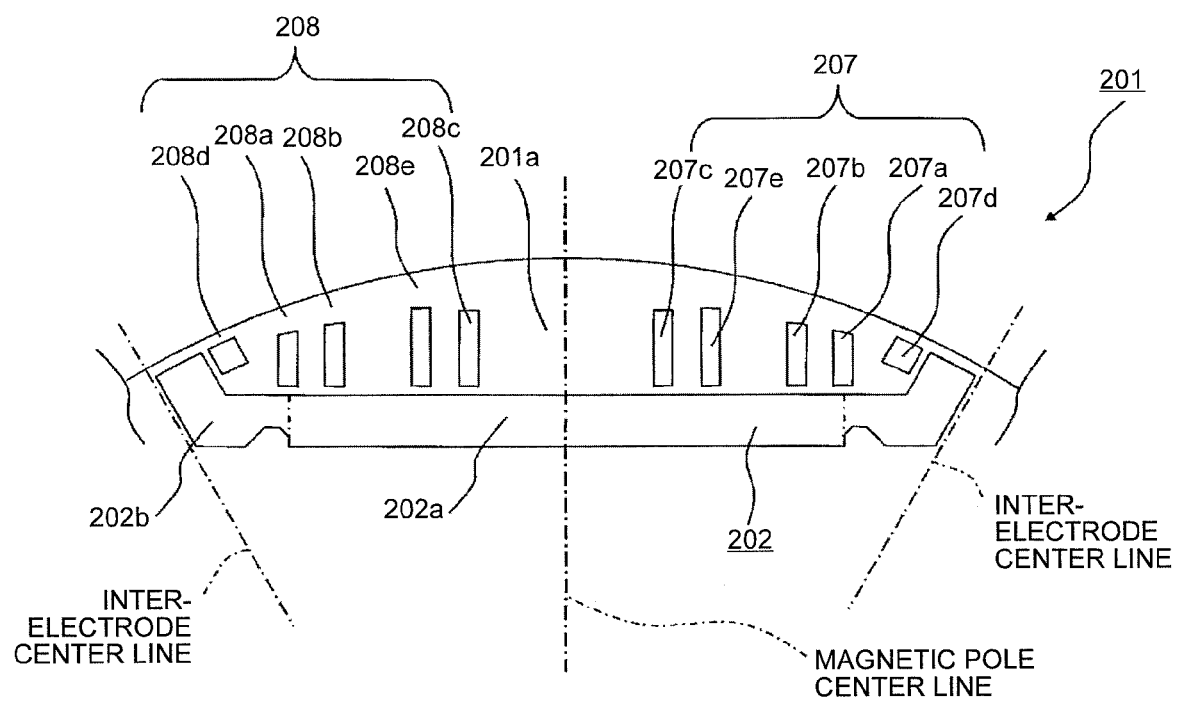
FIG. 14 is an enlarged view of a W-part of FIG. 12.
Figure 15:
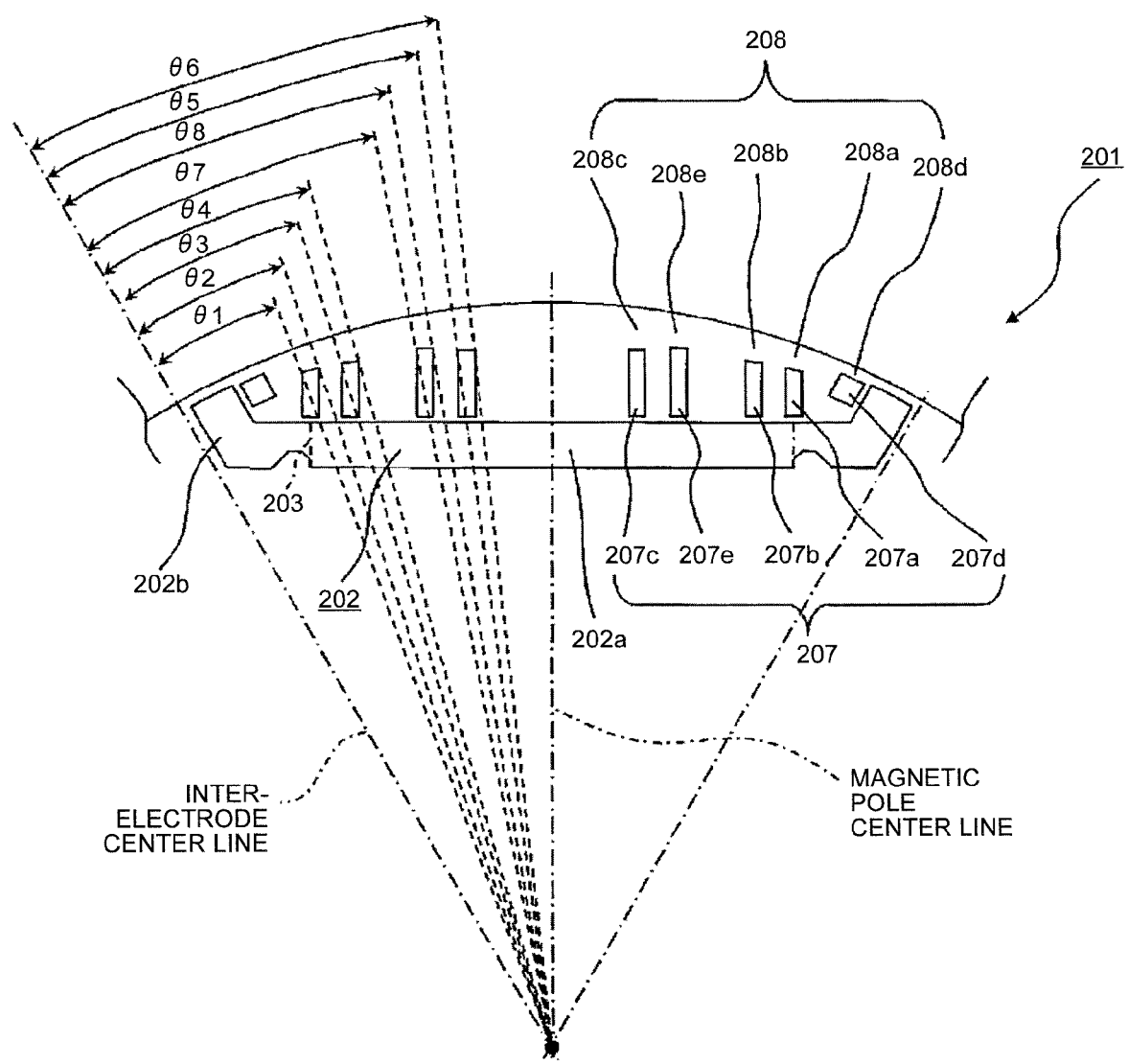
FIG. 15 is an illustration showing the first embodiment, in which angles formed by the inter-electrode center line and ends of slits 207 on an outer circumference side of a rotor are defined.
Figure 16:
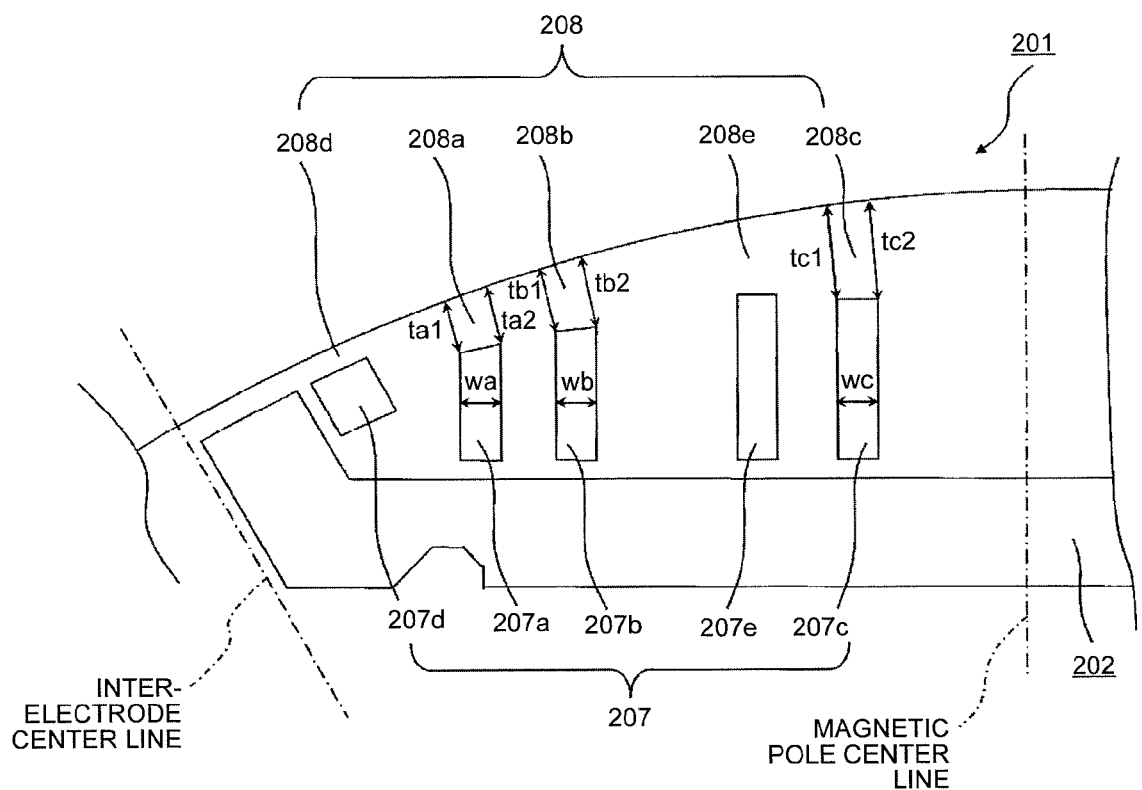
FIG. 16 is an illustration showing the first embodiment, in which a width of slit thin sections 208 in the radial direction is defined.

FIGS. 11 to 16 are figures showing the first embodiment. FIG. 11 is a transverse cross sectional view of a rotor 200 of a permanent magnet embedded motor in a modification. FIG. 12 is a transverse cross sectional view of a rotor iron core 201 in the modification. FIG. 13 is a V-part enlarged view of FIG. 11. FIG. 14 is a W-part enlarged view of FIG. 12. FIG. 15 is an illustration for defining angles formed between the inter-electrode center line and ends of slits 207 on a rotor outer circumference side. FIG. 16 is an illustration for defining widths in the radial direction of slit thin sections 208.

In the rotor 200 of the permanent magnet embedded motor in the modification, as shown in FIG. 11, ten slits 207 are formed for one magnetic pole.

The configuration of the rotor 200 of the permanent magnet embedded motor is explained with reference to FIGS. 11 to 16.

The rotor 200 of the permanent magnet embedded motor is simply referred to as rotor 200. The rotor 200 is sometimes referred to as rotor.

The rotor 200 in the modification shown in FIG. 11 includes at least a rotor iron core 201, a permanent magnet 203, and a rotating shaft 204.

When the rotor 200 in the modification shown in FIG. 11 is compared with the rotor 100 shown in FIG. 4, the rotor iron core 201 is different from the rotor iron core 101. Otherwise, the rotor 200 is the same as the rotor 100.

The rotor iron core 201 has a substantially circular shape as an overall transverse cross sectional shape. The rotor iron core 201 is formed by perforating, with a die, a thin electromagnetic steel plate (e.g., a non-directional electromagnetic steel plate (in which crystal axis directions of crystals are arranged as randomly as possible not to show a magnetic characteristic biasing to a specific direction of the steel plate) having a thickness of about 0.1 to 1.0 mm) in a predetermined shape and stacking a predetermined number (a plurality) of the electromagnetic steel plates.

In the rotor iron core 201, six permanent magnet insertion holes 202 having a rectangular transverse cross section are provided to form a substantially hexagonal shape in the circumferential direction (see FIG. 12).

The rotor 200 having six poles is formed by inserting six flat-shaped permanent magnets 203 magnetized to alternately have N poles and S poles into the inside of magnet insertion sections 202a (see FIG. 14) of the permanent magnet insertion holes 202. A shaft hole 205 in which the rotating shaft 204 fits is formed in substantially the center of the rotor iron core 201 (see FIG. 12).

For the permanent magnets 203, for example, rare earths containing neodymium, iron and boron as main components, and the like are used.

As shown in FIG. 14, in the permanent magnet insertion hole 202, permanent magnet end gaps 202b coupled to (communicating with) the magnet insertion section 202a are formed on both sides of the magnet insertion section 202a substantially situated in the center. The permanent magnet end gaps 202b suppress leakage magnetic fluxes of the permanent magnet 203 in an inter-electrode section (between magnetic poles formed by the permanent magnets 203 and between the permanent magnet insertion holes 202).

As shown in FIGS. 13 and 14, a plurality of slits 207 (fourth slits 207d, first slits 207a, second slits 207b, fifth slits 207e, and third slits 207c are arranged symmetrically with respect to a magnetic pole center line) are formed in a circumferential iron core section 201a of the permanent magnet insertion hole 202. The third slits 207c are closest to the magnetic pole center line, and the fifth slits 207e, the second slits 207b, the first slits 207a, and the fourth slits 207d are formed in order toward an inter-electrode section (an inter-electrode center line). The slits 207 and the like are sometimes simply referred to as slits.

The slits 207 are defined as follows.

(1) The first slits 207a are located on the end side of the permanent magnet 203 (the permanent magnet end gap 202b side, the inter-electrode section side) and present in the radial direction of an end face 203a at the end of the permanent magnet 203. However, the first slits 207a may be present in positions not overlapping the end face 203a.

(2) The second slits 207b are located adjacent to the first slits 207a and on the magnetic pole center side.

(3) The fifth slits 207e are located adjacent to the second slits 207b and on the magnetic pole center side.

(4) The third slits 207c are located adjacent to the fifth slits 207e and on the magnetic pole center side.

(5) The fourth slits 207d are located adjacent to the first slits 207a and on the inter-electrode section side.

In one magnetic pole, the fourth slits 207d, the first slits 207a, the second slits 207b, the fifth slits 207e and the third slits 207c are symmetrically arranged.

As shown in FIGS. 13 and 14, slit thin sections 208, that are iron core sections, are provided between the outer circumference of the rotor iron core 201 and the slits 207.

(1) A slit thin section 208d is provided between the outer circumference of the rotor iron core 201 and the fourth slit 207d.

(2) A slit thin section 208a is provided between the outer circumference of the rotor iron core 201 and the first slit 207a.

(3) A slit thin section 208b is provided between the outer circumference of the rotor iron core 201 and the second slit 207b.

(4) A slit thin section 208e is provided between the outer circumference of the rotor iron core 201 and the fifth slit 207e.

(5) A slit thin section 208c is provided between the outer circumference of the rotor iron core 201 and the third slit 207c.

As shown in FIG. 15, angles formed between the inter-electrode center line and the ends of the slits 207 on the rotor outer circumference side are defined as follows.

(1) θ1 is defined as an angle formed between a line connecting an ends of the first slot 207a on the rotor outer circumference side and on the inter-electrode side with the center of the rotor iron core 201 and the inter-electrode center line.

(2) θ2 is defined as an angle formed between a line connecting an end of the first slit 207a on the rotor outer circumference side and on the magnetic pole center side with the center of the rotor iron core 201 and the inter-electrode center line.

(3) θ3 is defined as an angle formed between a line connecting an end of the second slit 207b on the rotor outer circumference side and on the inter-electrode side with the center of the rotor iron core 201 and the inter-electrode center line.

(4) θ4 is defined as an angle formed between a line connecting an end of the second slit 207b on the rotor outer circumference side and on the magnetic pole center side with the center of the rotor iron core 201 and the inter-electrode center line.

(5) θ5 is defined as an angle formed between a line connecting an end of the third slit 207c on the rotor outer circumference side and on the inter-electrode side with the center of the rotor iron core 201 and the inter-electrode center line.

(6) θ6 is defined as an angle formed between a line connecting an end of the third slit 207c on the rotor outer circumference side and on the magnetic pole center side with the center of the rotor iron core 201 and the inter-electrode center line.

(7) θ7 is defined as an angle formed between a line connecting an end of the fifth slit 207e on the rotor outer circumference side and on the inter-electrode side with the center of the rotor iron core 201 and the inter-electrode center line.

(8) θ8 is defined as an angle formed between a line connecting an end of the fifth slit 207e on the rotor outer circumference side and on the magnetic pole center side with the center of the rotor iron core 201 and the inter-electrode center line.

As shown in FIG. 16, widths (dimensions) of the slit thin sections 108 in the radial direction are defined as follows.

(1) ta1 is defined as a width (shortest distance) in the radial direction at the inter-electrode side end on the rotor outer circumference side of the slit thin section 208a.

(2) ta2 is defined as a width (shortest distance) in the radial direction at the magnetic pole center side end on the rotor outer circumference side of the slit thin section 208a.

(3) tb1 is defined as a width (shortest distance) in the radial direction at the inter-electrode side end on the rotor outer circumference side of the slit thin section 208b1.

(4) tb2 is defined as a width (a shortest distance) in the radial direction at the magnetic pole center side end on the rotor outer circumference side of the slit thin section 208b.

(5) tc1 is defined as a width (shortest distance) in the radial direction at the inter-electrode side end on the rotor outer circumference side of the slit thin section 208c.

(6) tc2 is defined as a width (shortest distance) in the radial direction at the magnetic pole center side end on the rotor outer circumference side of the slit thin section 208c.

ta1 and ta2 have a relation of ta1<ta2. The width of the slit thin section 208a gradually increases from the inter-electrode side toward the magnetic pole center.

tb1 and tb2 have a relation of tb1<tb2. The width of the slit thin section 208b gradually increases from the inter-electrode side toward the magnetic pole center.

Further, tc1 and tc2 have a relation of tc1<tc2. The width of the slit thin section 208c gradually increases from the inter-electrode side toward the magnetic pole center.

Widths in the circumferential direction of the slits 207 (the first slit 207a, the second slit 207b, and the third slit 207c) are defined as follows.

(1) wa is defined as a width in the circumferential direction of the first slit 207a.

(2) wb is defined as a width in the circumferential direction of the second slit 207b.

(3) wc is defined as a width in the circumferential direction of the third slit 207c.

In this embodiment, basically, wa=wb=wc (about 1.0 to 1.5 mm) is set. However, a form of wa>wb=wc is also included in the embodiment. If wa>wb=wc, then the width wa of the first slit 207a located at the end of the permanent magnet 203 is larger than wb and wc. Therefore, there is an effect of suppressing leakage of magnetic fluxes at the end of the permanent magnet 203.

Similarly to how setting is made in the rotor 100, a torque ripple can be reduced by setting relations between ta1, ta2, tb1, tb2, tc1 and tc2, and θ1 to θ6 as shown below.

$$ta1 = K \sin(\theta 1 \times P/2) \quad \text{Formula (1)}$$

$$ta2 = K \sin(\theta 2 \times P/2) \quad \text{Formula (2)}$$

$$tb1 = K \sin(\theta 3 \times P/2) \quad \text{Formula (3)}$$

$$tb2 = K \sin(\theta 4 \times P/2) \quad \text{Formula (4)}$$

$$tc1 = K \sin(\theta 5 \times P/2) \quad \text{Formula (5)}$$

$$tc2 = K \sin(\theta 6 \times P/2) \quad \text{Formula (6)}$$

where, K represents a constant and P represents the number of poles (herein, P=6 (FIG. 11)).

Also in the rotor 200, as shown in FIG. 10, the radial direction widths ta1, ta2, tb1, tb2, tc1 and tc2 of the slit thin sections 208a, 208b and 208c, and the radial direction widths between them are present on a curve of a sine wave.

It is desirable that all the slits satisfy the generalized Formulas (7) and (8). However, to increase the effects of prevention of the leakage magnetic flux, the slit thin section 208d of the fourth slit 207d is set small relative to the widths in the radial direction of the other slit thin sections (the slit thin sections 208a, 208b, 208c and 208e), so that the fourth slit 207d has a shape that does not satisfy the relations of Formulas (7) and (8). In addition, since at least six slits only have to be provided for one magnetic pole, the slit thin sections 208a, 208b and 208c of the first slit 207a, the second slit 207b and the third slit 207c are configured to satisfy Formulas (7) and (8). The slit thin section 208e of the fifth slit 207e does not have to satisfy Formulas (7) and (8).

Figure 17:
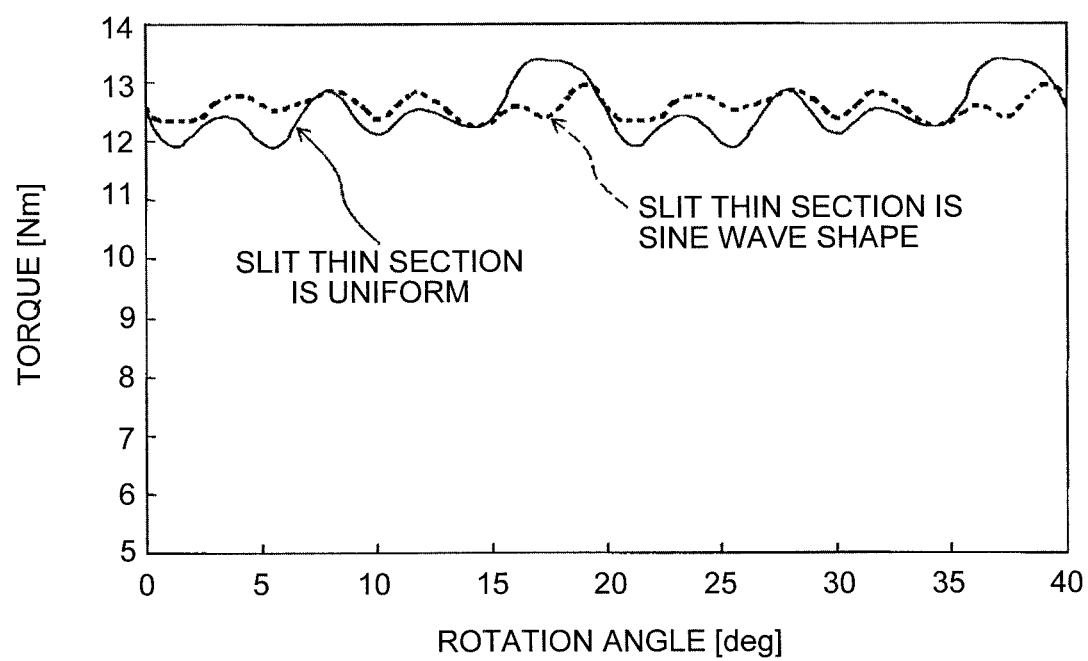
FIG. 17 is a graph showing the first embodiment, in which torque waveforms at a time when the widths in the radial direction of the slit thin sections 208 are fixed and at a time when six slits 207 (first slits 207a, second slits 207b, and third slits 207c) present in the radial direction of a permanent magnet 203 are formed in a shape satisfying Formula (7) and Formula (8) are defined in the rotor 200 in the modification.

FIG. 17 is a figure showing the first embodiment, in which torque waveforms in the rotor 200 in the modification are shown in the case where the widths in the radial direction of the slit thin sections 208 are fixed and in the case where the six slits 207 (the first slits 207a, the second slits 207b and the third slits 207c) that are present in the radial direction of the permanent magnet 203 are formed in a shape satisfying Formulas (7) and (8).

As seen from FIG. 17, when the six slits 207 (the first slits 207a, the second slits 207b and the third slits 207c) present in the radial direction of the permanent magnet 203 are formed in the shape satisfying Formulas (7) and (8), pulsation of the torque is small compared with pulsation of the torque caused when the widths in the radial direction of all the slits 207 are fixed. In the example explained above, the radial direction widths of the slit thin sections 208a, 208b and 208c change in the sine wave shape like ta1 to ta2, tb1 to tb2 and tc1 to tc2, respectively, and the widths are not uniform. However, the respective radial direction widths may be set uniform. In that case, however, it is essential that the uniform radial direction widths are set between ta1 and ta2, between tb1 and tb2 and between tc1 and tc2, respectively.

Figure 18:
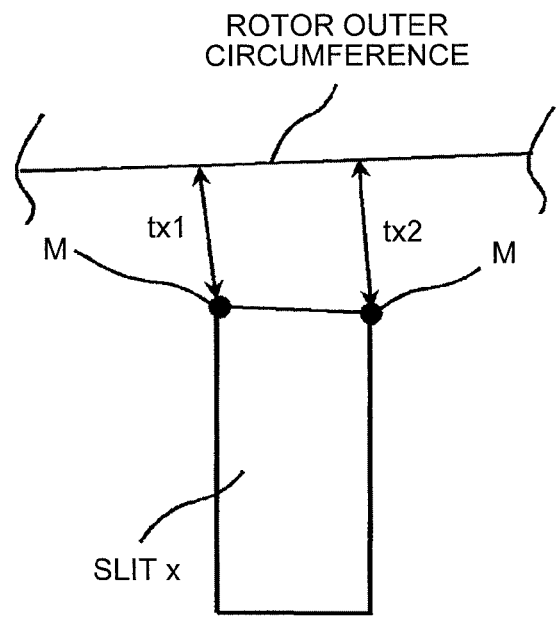
FIG. 18 is an illustration showing the first embodiment in which an end (an outer circumference side of a rotor) of a slit x when corners of the slit x are edges is defined.
Figure 19:
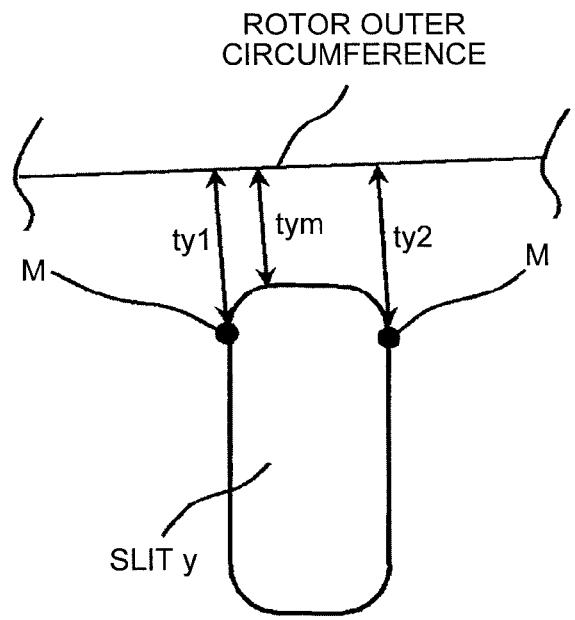
FIG. 19 is an illustration showing the first embodiment, in which an end (an outer circumference side of a rotor) of a slit y when corners of the slit y are rounded is defined.
Figure 20:
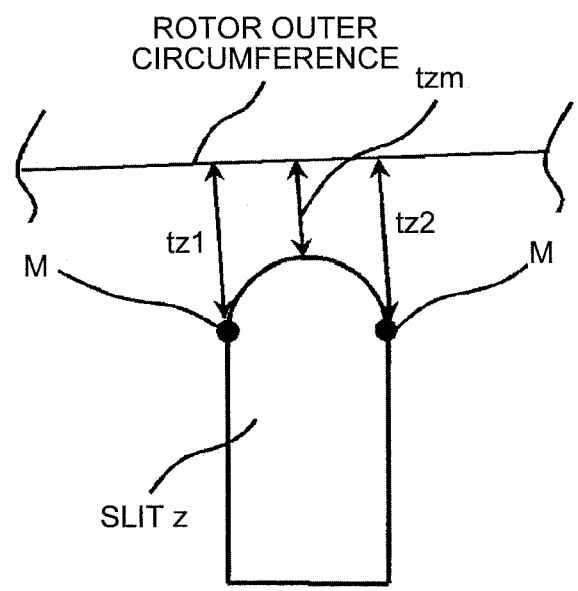
FIG. 20 is an illustration showing the first embodiment, in which an end (an outer circumference side of a rotor) of a slit z when one side of the slit z is an arc is defined.

FIGS. 18 to 20 are figures showing the first embodiment. FIG. 18 is an illustration for defining an end (on a rotor outer circumference side) of the slit x, corners of which are edges. FIG. 19 is an illustration for defining an end (on a rotor outer circumference side) of a slit y, corners of which are rounded. FIG. 20 is an illustration for defining an end (on a rotor outer circumference side) of a slit z, one side of which is an arc.

In the slit x explained above (e.g., any of the first slit 107a, the second silt 107b, and the third slit 107c in FIG. 9), the corners of the slit x are edges as shown in FIG. 18. Therefore, if the widths tx1 and tx2 in the radial direction of a slit thin section at a rotor outer circumference side end M of the slit x satisfy Formulas (7) and (8), then a slit thin section between the both ends M also satisfies Formulas (7) and (8) (i.e., is on a sine wave).

However, in an actual product, corners of a die for perforating an electromagnetic steel plate are chamfered. Therefore, corners of the slit y are also chamfered (see FIG. 19). In this case, a slit thin section having width tym in the radial direction smaller than a width ty1 in the radial direction of a slit thin section at the inter-electrode side end is present between both the ends M. Therefore, in this case, the width tym (minimum) in the radial direction is selected to be set between the widths tx1 and tx2 in the radial direction of the slit thin section that satisfies Formulas (7) and (8) in FIG. 18.

Further, when a side opposed to the rotor outer circumference of the four sides of the slit z is an arc, a slit thin section having a width tzm in the radial direction smaller than a width tz1 in the radial direction of the slit thin section at the inter-electrode side end is present between both the ends M. Therefore, in this case, the width tzm (minimum) in the radial direction is selected to be set between the widths tx1 and tx2 in the radial direction of the slit thin section that satisfies Formulas (7) and (8) in FIG. 18.

As an effect of this embodiment, by suppressing the influence of magnetism saturation of the slit thin sections 108 and 208, it possible to reduce harmonic components of an induced voltage, and reduce a harmonic loss thereby to configure a highly-efficient rotors 100 and 200.

Because a torque ripple is reduced, it is possible to configure the rotors 100 and 200 with low vibration. Therefore, it is possible to obtain the rotors 100 and 200 having longer life.

The slits 107 and 207 are desirably substantially perpendicular to the permanent magnets 103 and 203. Unless the slits 107 and 207 are perpendicular to the permanent magnets 103 and 203 (the slits 107 or 207 are parallel), the dimensions between the slits 107 or the slits 207 gradually decrease and magnetic flux density increases. Therefore, magnetic saturation occurs to cause decrease in the induced voltage.

When the slits 107 and 207 are perpendicular to the permanent magnets 103 and 203, the magnetic flux density in the portions between the slits 107 or the slits 207 is fixed. Therefore, magnetic saturation does not occur and decrease in efficiency due to the magnetism saturation does not occur, so that the highly-efficient rotors 100 and 200 are achieved.

The number of poles is six in the rotors 100 and 200 explained above. However, even in the case of applying this embodiment to a rotor having the number of poles other than six, the induced voltage is increased and the influence of an armature reaction is limited, and a torque ripple is reduced, so as to configure a highly-efficient and low-noise rotor.

A stator (not shown in the figures) in this embodiment has the torque ripple reduction effect obtained by the rotor 100 or 200. Therefore, it is possible to attain the effect irrespective of the number of slots, a winding manner (concentrated winding or distributed winding), and the number of poles.

When a sintered rare earth magnet is used for the permanent magnet, because the sintered rare earth magnet has a high magnetic force, magnetic flux density of the rotor is higher than magnetic flux density obtained when other magnets are used, resulting in the influence of the slits being larger.

Therefore, it is possible to attain greater effect by using the sintered rare earth magnet in the rotor.

Figure 21:
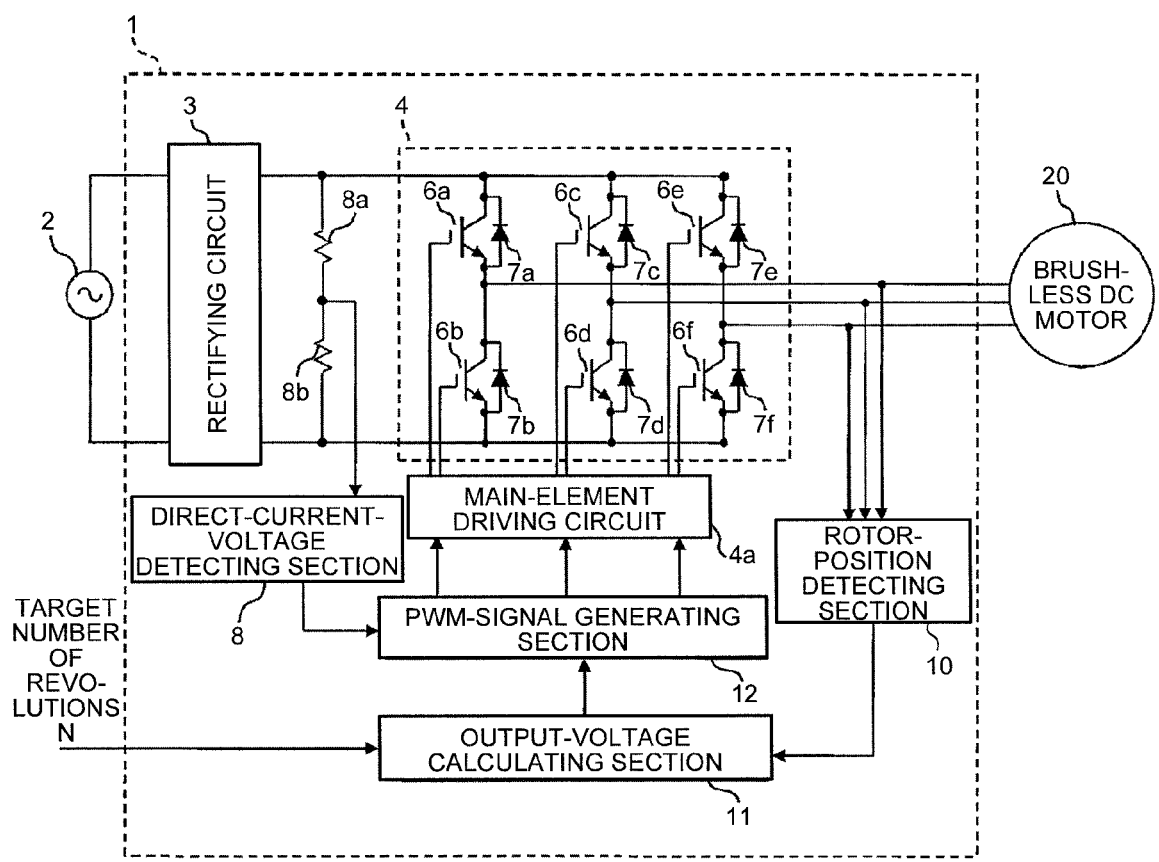
FIG. 21 is a circuit diagram showing a driving circuit 1 of a brushless DC motor 20 in the first embodiment.

Next, a driving circuit 1 of a brushless DC motor 20 (permanent magnet embedded motor) using the rotor 100 according to this embodiment is explained. FIG. 21 is a circuit diagram showing the first embodiment for the driving circuit 1 of the brushless DC motor 20. Alternating-current power is supplied from a commercial alternating-current power supply 2 provided on the outside to the driving circuit 1. The alternating-current voltage supplied from the commercial alternating-current power supply 2 is converted into a direct-current voltage by a rectifying circuit 3. The direct-current voltage obtained by the conversion of the rectifying circuit 3 is converted into an alternating-current voltage having a variable frequency by an inverter main circuit 4 and applied to the brushless DC motor 20. The brushless DC motor 20 is driven by alternating-current power having a variable frequency supplied from the inverter main circuit 4. The rectifying circuit 3 includes a chopper circuit that boosts a voltage applied from the commercial alternating-current power supply 2 and a smoothing capacitor that smoothes the rectified direct-current voltage.

The inverter main circuit 4 is an inverter circuit having a three-phase bridge. A switching section of the inverter main circuit 4 includes six IGBTs 6a to 6f (insulated gate bipolar transistors) functioning as inverter main elements and includes, as six flywheel diodes (FRDs), SiC-SBDs 7a to 7f (Schottky barrier diodes) in which silicon carbide (SiC) is used. The SiC-SBDs 7a to 7f functioning as the FRDs are reverse current preventing means for suppressing a counter electromotive force that occurs when the IGBTs 6a to 6f change an electric current from ON to OFF.

In this example, the IGBTs 6a to 6f and the SiC-SBDs 7a to 7f are configured as an IC module obtained by mounting chips on the same lead frame and molding the chips with epoxy resin to package the chips. Instead of IGBTs (Si-IGBTs) using silicon, the IGBTs 6a to 6f may be IGBTs using SiC or GaN (gallium nitride). Also, instead of the IGBTs, other switching elements such as MOSFETs (Metal-Oxide-Semiconductor Field-Effect Transistors) using Si, SiC or GaN may be used.

Two voltage dividing resistors 8a and 8b connected in series are provided between the rectifying circuit 3 and the inverter main circuit 4. A direct-current voltage detecting section 8 is provided, which samples and holds an electric signal obtained by reducing a high direct-current voltage with a voltage dividing circuit formed by the voltage dividing resistors 8a and 8b.

The brushless DC motor 20 includes a stator 20a (explained later) and the rotor 100. The rotor 100 is rotated by alternating-current power supplied from the inverter main circuit 4.

A rotor-position detecting section 10 is provided, which detects a terminal voltage of the brushless DC motor 20 and detects the position of the rotor 100 of the brushless DC motor 20. The rotor-position detecting section 10 processes an electric signal of the terminal voltage of the brushless DC motor 20 and converts the electric signal into position information of the rotor 100.

The position information of the rotor 100 detected by the rotor-position detecting section 10 is outputted to an output-voltage calculating section 11. The output-voltage calculating section 11 calculates, based on a command of a target number of revolutions N given from the outside of the driving circuit 1 or information of an operation condition of the apparatus and the position information of the rotor 100, an optimum output voltage of the inverter main circuit 4 that should be applied to the brushless DC motor 20. The output-voltage calculating section 11 outputs the calculated output voltage to a PWM-signal generating section 12. PWM is the abbreviation of Pulse Width Modulation.

The PWM-signal generating section 12 outputs such PWM signals that the output voltage given from the output-voltage calculating section 11 is in actuality, to a main-element driving circuit 4a that drives the respective IGBTs 6a to 6f of the inverter main circuit 4. Each of the IGBTs 6a to 6f of the inverter main circuit 4 is switched by the main-element driving circuit 4a.

Now a wideband gap semiconductor is explained. The wideband gap semiconductor is a general term for a semiconductor having a band gap wider than that of Si. SiC used in the SiC-SBDs 7a to 7f is one of wideband gap semiconductors, and instead of it there is gallium nitride (GaN), diamond, or the like. Further, the wideband gap semiconductor, in particular, SiC has higher heatproof temperature, greater dielectric breakdown strength, and higher thermal conductivity than Si. In this configuration, SiC is used for the FRDs of the inverter circuit. However, instead of SiC, other wideband gap semiconductors may be used.

The switching element using SiC realizes low-loss switching with a simple configuration, and can operate at high temperature. For this reason, it is possible to use the switching element near a motor (or an apparatus including the motor) having high temperature. Further, a cooling fan is unnecessary or a cooling fan with a small air volume can be used, thereby making it possible to reduce size and weight of a heat dissipation fin (heat sink or the like).

In this embodiment, the widths in the radial direction of the slit thin sections 108 are formed in a sine wave shape with respect to the angles formed by the inter-electrode center line and the lines connecting the rotor center with the ends of the slits 107, so as to reduce a torque ripple and result in the brushless DC motor 20 being configured to have low vibration.

By using SiC, the driving circuit 1 can be downsized, so that reliability against vibration is improved. Further, as explained in this embodiment, the widths in the radial direction of the slit thin sections 108 are formed in a sine wave shape with respect to the angles formed by the inter-electrode center line and the lines connecting the rotor center with the ends of the slits 107. Consequently, it is possible to reduce vibration from the brushless DC motor 20 (or a compressor mounted with the brushless DC motor 20). Therefore, it is possible to further improve the reliability of the driving circuit 1.

In other words, the reliability of the driving circuit 1 is remarkably improved by a synergetic effect of both the improvement of the reliability against vibration through the reduction in size of the driving circuit 1 and the reduction in vibration from the brushless DC motor 20 (or the compressor mounted with the brushless DC motor 20) through the use of the brushless DC motor 20 explained in this embodiment.

A switching element and a diode element that are formed by such SiC (wideband gap semiconductor) have high voltage endurance and high allowable current density, and so can be reduced in size. Thus, use of the downsized switching element and diode element enable a semiconductor module to be downsized incorporating these elements.

Because the heat resistance is also high, a heat dissipation fin of a heat sink can be reduced in size and a water cooling section can be changed to air cooling. Therefore, the semiconductor module can be further reduced in size.

Further, because a power loss is small, it is possible to improve the efficiency of the switching element and the diode element. As a result, it is possible to improve the efficiency of the semiconductor module.

An example of a scroll compressor mounted with the brushless DC motor 20 using the rotor 100 in this embodiment is explained. The scroll compressor is publicly known except a permanent magnet embedded motor (brushless DC motor). Therefore, detailed explanation of the scroll compressor is omitted.

Figure 22:
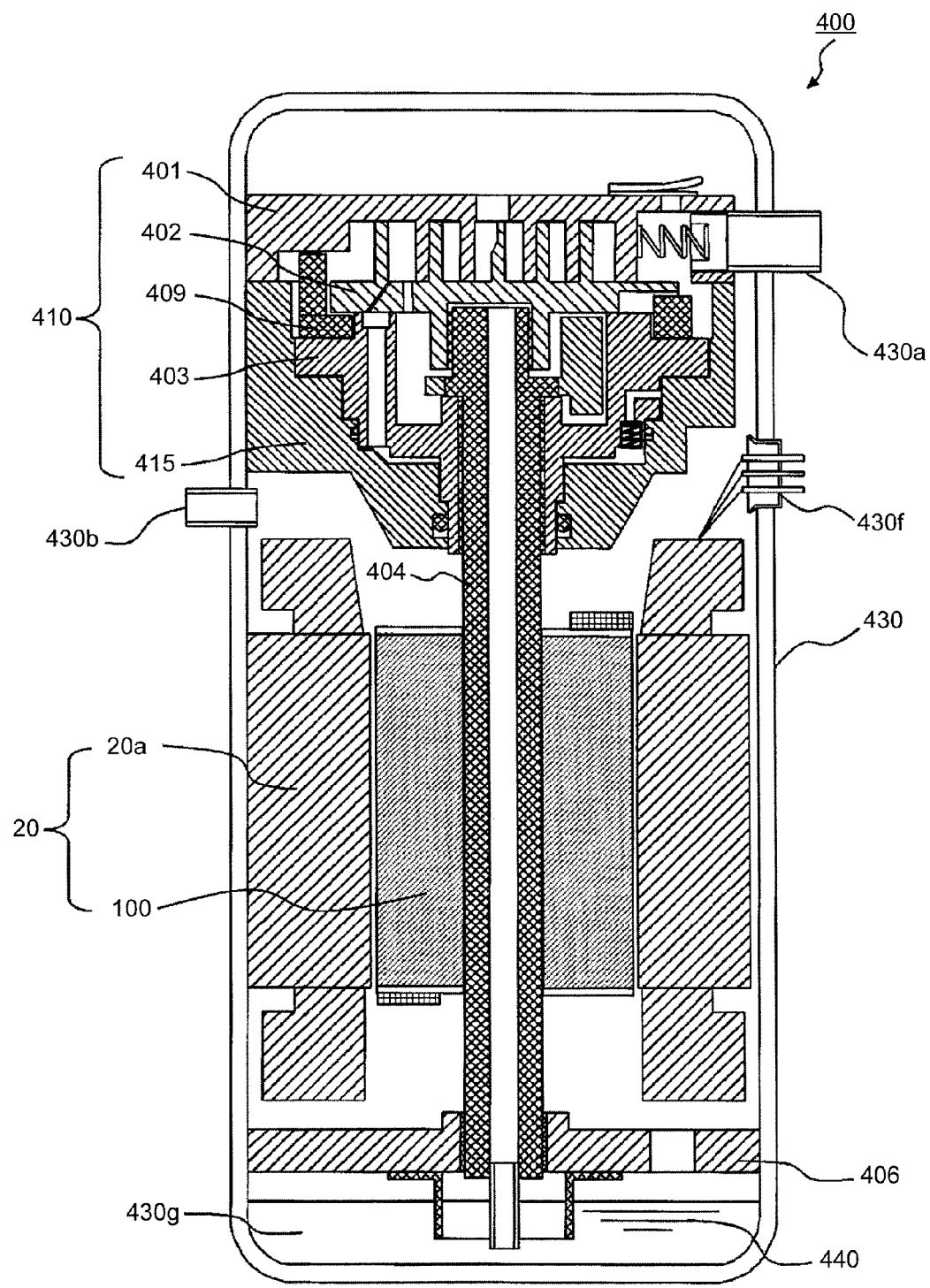
FIG. 22 is a longitudinal sectional view of a scroll compressor 400 mounted with the brushless DC motor 20 in the first embodiment.

FIG. 22 is a longitudinal sectional view of a scroll compressor 400 mounted with the brushless DC motor 20 for showing the first embodiment. As shown in FIG. 22, the scroll compressor 400 (an example of a compressor) includes, in a sealed container 430, at least a compressing mechanism unit 410, the brushless DC motor 20, a main shaft 404 that couples the compressing mechanism unit 410 with the brushless DC motor 20, a sub-frame 406 that supports an end (a sub-shaft section) of the main shaft 404 on the opposite side of the compressing mechanism unit 410, and refrigerating machine oil 440 stored in an oil reservoir 430g in the bottom section of the sealed container 430.

The compressing mechanism unit 410 includes, at least, a fixed scroll 401 and a swinging scroll 402, tabular spiral teeth of which are meshed with each other to form a compression chamber between them, an Oldham ring 409, a compliant frame 403, and a guide frame 415.

A suction pipe 430a is pressed into the fixed scroll 401 with penetrating through the sealed container 430 so as to communicate with a suction pressure space from a side in a direction perpendicular to the tabular spiral teeth of the fixed scroll 401.

A discharge pipe 430b for discharging, to the outside (a refrigeration cycle), high-pressure refrigerant gas discharged from a discharge port of the fixed scroll 401 is provided between the compressing mechanism unit 410 and the brushless DC motor 20 with penetrating through the sealed container 430.

The brushless DC motor 20 includes the stator 20a applied with three-phase winding and the rotor 100 in this embodiment.

A glass terminal 430f for supplying an output of the driving circuit 1 to the stator 20a of the brushless DC motor 20 is welded to the sealed container 430.

Figure 23:
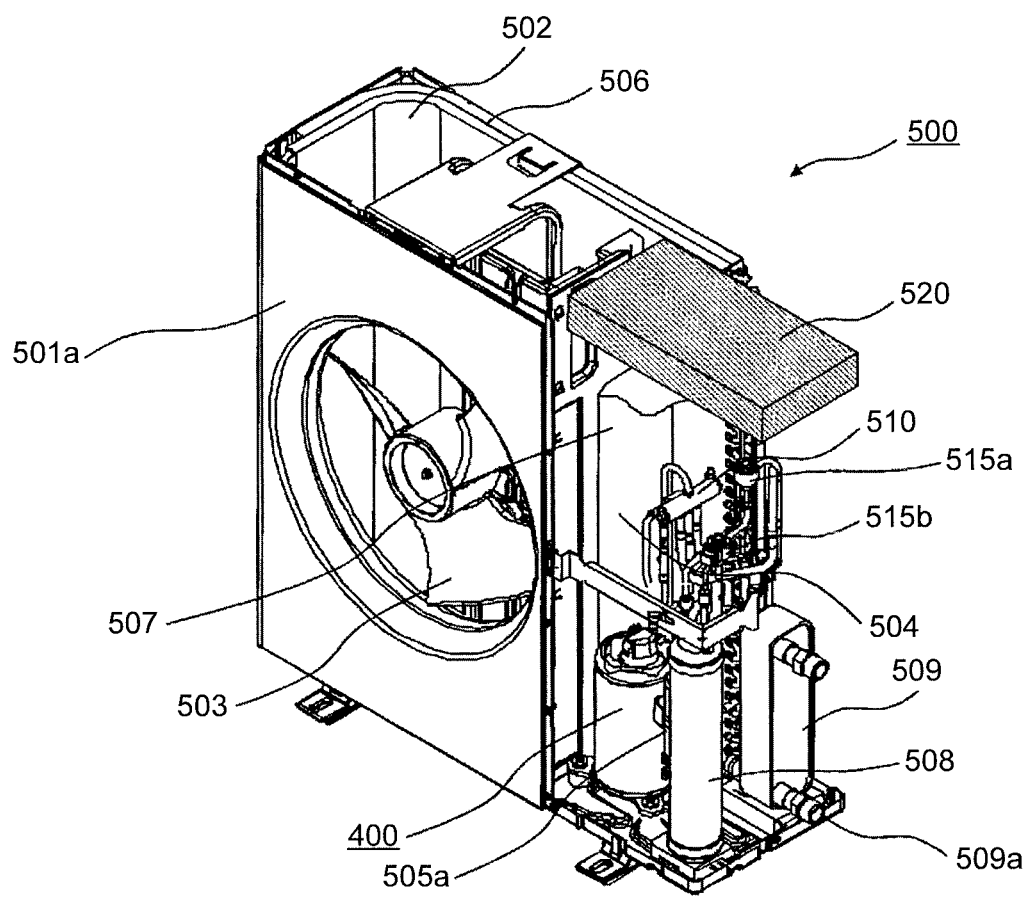
FIG. 23 is a perspective view of a water heat exchange apparatus 500 mounted with the scroll compressor 400 in the first embodiment.
Figure 24:
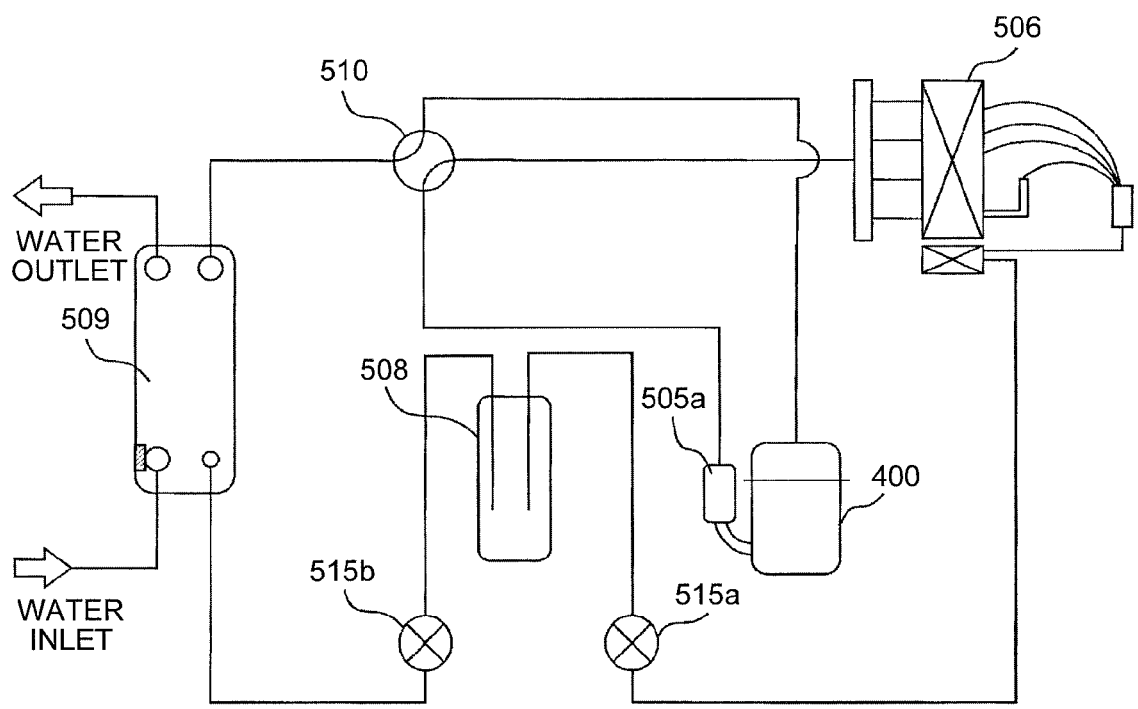
FIG. 24 is a refrigerant circuit diagram of the water heat exchange apparatus 500 in the first embodiment.

FIGS. 23 and 24 are figures showing the first embodiment. FIG. 23 is a perspective view of a water heat exchange apparatus 500 mounted with the scroll compressor 400. FIG. 24 is a refrigerant circuit diagram of the water heat exchange apparatus 500.

An example of a refrigeration and air conditioning apparatus mounted with the scroll compressor 400 using the brushless DC motor 20 (driven by the driving circuit 1) in which the rotor 100 in this embodiment is used, as a driving source, is explained with reference to the water heat exchange apparatus 500.

As shown in FIG. 23, the water heat exchange apparatus 500 is extremely like an outdoor machine of a separate type air conditioner. The water heat exchange apparatus 500 includes, on the front surface side, a front grill 501a from which the air is blown out. The water heat exchange apparatus 500 is an apparatus that, for example, heats water to generate hot water or cools water to generate cold water through a refrigeration cycle. Thus, the water heat exchange apparatus 500 is a water heat exchange apparatus for one type of refrigeration and air conditioning apparatus. The water heat exchange apparatus 500 is characterized in that a refrigerant circuit is completed within the water heat exchange apparatus 500. Only water piping work is performed in a site.

The water heat exchange apparatus 500 includes an air blower chamber 502 and a machine chamber 504. The air blower chamber 502 and the machine chamber 504 are partitioned by a separator 507. In the air blower chamber 502, an air-refrigerant heat exchanger 506 in which the air and the refrigerant perform heat exchange, a fan 503 that blows the air to the air-refrigerant heat exchanger 506, and the like are disposed. The water heat exchange apparatus 500 includes, above the machine chamber 504, an electrical component box 520 in which electrical components are housed. The driving circuit 1 that drives the brushless DC motor 20 of the scroll compressor 400 is incorporated in the electrical component box 520.

In the machine chamber 504, the scroll compressor 400 that performs compression of the refrigerant, an accumulator 508 that is provided on a suction side of the scroll compressor 400 and stores the refrigerant, a four-way valve 510 that switches a flow of the refrigerant, a plate-type heat exchanger 509 in which the refrigerant and the water perform heat exchange, electronic expansion valves 515a and 515b used as decompressing devices for the refrigerant, and the like are disposed. The scroll compressor 400 includes a suction muffler 505a on the suction side. In this embodiment, an R410A refrigerant is used and heat pump operation based on the scroll compressor 400 driven by the inverter (the driving circuit 1) is performed to contribute to power saving and $CO_2$ reduction.

The plate-type heat exchanger 509 includes a refrigerant pipe connection port (not shown in the figure) on the front surface side and a water pipe connection port 509a on the rear surface side. The plate-type heat exchanger 509 is covered with a holding case that surrounds the periphery of the plate-type heat exchanger 509. However, in FIG. 23, the holding case is omitted.

The refrigerant circuit has a configuration shown in FIG. 24. In FIG. 24, a high-pressure and high-temperature gas refrigerant is supplied to the plate-type heat exchanger 509 from the scroll compressor 400 to heat water that enters a water circuit of the plate-type heat exchanger 509. The scroll compressor 400 compresses the refrigerant (e.g., R410A) to be the high-pressure and high-temperature gas refrigerant and supplies the gas refrigerant to the plate-type heat exchanger 509 via the four-way valve 510. In the plate-type heat exchanger 509, the refrigerant and the water form counter flows, heat exchange is performed between the refrigerant and the water, and the water is heated. The liquid refrigerant exiting the plate-type heat exchanger 509 is overcooled (subcooled) by the electronic expansion valve 515b and enters the accumulator 508. Further, the liquid refrigerant is decompressed by the electronic expansion valve 515a to become a two-phase refrigerant, evaporated in the air-refrigerant heat exchanger 506 to become a low-pressure gas refrigerant, and returns to the scroll compressor 400 from the suction muffler 505a via the four-way valve 510. The high-temperature water heated by the plate-type heat exchanger 509 is supplied to a hot-water supply tank, a fan coil unit and the like, not shown in the figure.

When the water is cooled in the plate-type heat exchanger 509, a flow of the refrigerant is in a direction opposite to the direction explained above. The scroll compressor 400 compresses the refrigerant (e.g., R410A) to be the high-pressure and high-temperature gas refrigerant and supplies the gas refrigerant to the air-refrigerant heat exchanger 506 via the four-way valve 510. The liquid refrigerant exiting the air-refrigerant heat exchanger 506 is overcooled by the electronic expansion valve 515a, and enters the accumulator 508. Further, the refrigerant is decompressed by the electronic expansion valve 515b to become a two-phase refrigerant and evaporated in the plate-type heat exchanger 509 to become a low-pressure gas refrigerant. In the plate-type heat exchanger 509, the refrigerant and the water form parallel flows, heat exchange is performed between the refrigerant and the water, and the water is cooled. The low-pressure gas refrigerant exiting the plate-type heat exchanger 509 returns to the scroll compressor 400 from the suction muffler 505a via the four-way valve 510. The water cooled in the plate-type heat exchanger 509 is supplied to, for example, the fan coil unit and used for cooling or the like.

As explained already, the water piping work to the water pipe connection port 509a disposed on the rear surface side of the plate-type heat exchanger 509 is performed in a site.

Because R410A is used as the refrigerant, the water heat exchange apparatus 500 complies with the $CO_2$ emission reduction measures in the energy policy in Europe.

As explained above, the water heat exchange apparatus 500 includes, above the machine chamber 504, the electrical component box 520 that houses the electrical components. In the electrical component box 520, the driving circuit 1 that drives the brushless DC motor 20 of the scroll compressor 400 is incorporated. Therefore, the driving circuit 1 is affected by the heat of the scroll compressor 400 and the like.

A compressor is heated by the heat of a motor and a compressed refrigerant. Therefore, the driving circuit in the past in which Si is used for its elements is susceptible to heat as compared with SiC, so that it is necessary to separate the driving circuit of the motor from the compressor by a predetermined distance.

For the reason that the compressor and the driving circuit are mounted on a water heat exchange apparatus, the compressor and the driving circuit are separated by a certain distance to prevent the reliability of the circuit from being deteriorated by the vibration of the compressor, so as to reduce the influence of the vibration of the compressor.

By changing Si in the past to SiC, the heat sink can be reduced in size because heat resistance is improved. Therefore, reliability against the vibration from the compressor is improved. Further, because the brushless DC motor 20 using the rotor 100 in this embodiment has low vibration, the reliability of the driving circuit 1 is remarkably improved by using the driving circuit 1 using SiC and the rotor 100 in combination.

Even if, without changing Si in the past, the heat sink is increased in size to improve heat resistance and the driving circuit is set in contact with or in the vicinity of the compressor on the same surface as a compressor grounding surface to cause no problem in heat resistance, the driving circuit is susceptible to vibration due to the up-sized heat sink and the reliability of the driving circuit is deteriorated. In other words, in the case of Si in the past, it has been difficult to set the circuit in contact with or in the vicinity of the compressor on the same surface as the compressor grounding surface. As a result, there have been problems, for example, in that the apparatus is increased in size.

To set the circuit in contact with or in the vicinity of the compressor on the same surface as the compressor grounding surface, it is necessary to improve the heat resistance and the reliability against vibration.

By changing Si to SiC, the heat resistance is improved. Therefore, without adopting a configuration for improving the heat resistance (e.g., increasing the heat sink in size as explained above), there is not problem for the heat resistance even if the circuit is set in contact with or in the vicinity of the compressor on the same surface as the compressor grounding surface.

However, the deterioration in the reliability against the vibration from the compressor due to the setting of the circuit in contact with or in the vicinity of the compressor on the same surface as the compressor grounding surface is unavoidable.

In the scroll compressor 400 mounted with the brushless DC motor 20 in which the rotor 100 in this embodiment is used, it is possible to reduce the vibration of the scroll compressor 400. Therefore, it is possible to suppress the deterioration in the reliability of the driving circuit 1 by setting the driving circuit 1 in contact with or in the vicinity of the scroll compressor 400 on the same surface as a grounding surface of the scroll compressor 400.

Because SiC is excellent in heat resistance, the heat sink can be reduced in size. If the heat sink is used in combination with the scroll compressor 400 mounted with the brushless DC motor 20 in which the rotor 100 in this embodiment is used, the heat resistance and the reliability against vibration are improved. Because the driving circuit 1 can be set in contact with or in the vicinity of the scroll compressor 400 on the same surface as the grounding surface of the scroll compressor 400, a degree of freedom of arrangement of the driving circuit 1 increases and the apparatus can be reduced in size.

The invention claimed is:

1. A rotor of a permanent magnet embedded motor comprising:
    a rotor iron core formed by stacking a predetermined number of electromagnetic steel plates perforated in a predetermined shape;
    a plurality of permanent magnet insertion holes formed along an outer circumferential section of the rotor iron core;
    permanent magnet end gaps provided at both ends of the permanent magnet insertion hole;
    a permanent magnet inserted into the permanent magnet insertion hole; and
    a plurality of slits formed in an iron core section on an outer side of the permanent magnet insertion hole, wherein each of the slits has a rectangular shape, wherein
    a width in a radial direction of a slit thin section of each of the slits between the slit and the rotor iron core outer circumference gradually increases from an inter-electrode side toward a magnetic pole center and changes in a sine wave shape having a peak in the magnetic pole center.

2. The rotor of the permanent magnet embedded motor according to claim 1, wherein
    in an arbitrary slit x among the slits, which has an inter-electrode side end and a magnetic pole center side end on the rotor iron core outer circumference side that are formed of edges,
    where
    tx1 is a width in the radial direction at an inter-electrode side end on a rotor outer circumference side of a slit thin section of the slit x,
    tx2 is a width in the radial direction at the magnetic pole center side end on the rotor outer circumference side of the slit thin section of the slit x,
    θx1 is an angle formed between a line connecting an end on the rotor outer circumference side and on the inter-electrode side of the slit x with a center of the rotor iron core and an inter-electrode center line,
    θx2 is an angle formed between a line connecting an end on the rotor outer circumference side and on the magnetic pole center side of the slit x with the center of the rotor iron core and the inter-electrode center line,
    K is a constant, and
    P is the number of poles, $$tx1 = K \sin(\theta x1 \times P/2) \qquad \text{Formula (7)}$$

$$tx2 = K \sin(\theta x2 \times P/2) \qquad \text{Formula (8)}$$

are satisfied.

3. The rotor of the permanent magnet embedded motor according to claim 2, wherein at least six slits x in total that satisfy Formulas (7) and (8) are formed in one magnetic pole symmetrically with respect to the magnetic pole center line, three slits x being formed on each side from the magnetic pole center line.

4. The rotor of the permanent magnet embedded motor according to claim 2, wherein, in the case of the slit having an inter-electrode side end and a magnetic pole center side end on the rotor iron core outer circumference side, which are rounded, a minimum value of a width in the radial direction of a slit thin section of the slit is present between tx1 and tx2.

5. The rotor of the permanent magnet embedded motor according to claim 2, wherein, in the case of the slit having a side on the rotor iron core outer circumference side, which is formed as an arc, a minimum value of a width in the radial direction of a slit thin section of the slit is present between tx1 and tx2.

6. The rotor of the permanent magnet embedded motor according to claim 1, wherein the slit is arranged substantially perpendicularly to the permanent magnet insertion hole.

7. The rotor of the permanent magnet embedded motor according to claim 1, wherein a rare earth magnet is used as the permanent magnet.

8. The rotor of the permanent magnet embedded motor according to claim 1, wherein the rotor is applied to a permanent magnet embedded motor driven by a driving circuit in which a device using SiC (silicon carbide) is used for a switching section of an inverter main circuit.

9. A compressor driven by a permanent magnet embedded motor using the rotor of the permanent magnet embedded motor according to claim 1.

10. A refrigeration and air conditioning apparatus mounted with the compressor according to claim 9.

* * * * *